(12) United States Patent
Yano et al.

(10) Patent No.: US 6,401,854 B2
(45) Date of Patent: Jun. 11, 2002

(54) DRIVING SYSTEM FOR A WORKING VEHICLE

(75) Inventors: Kazuhiko Yano; Toshiro Azuma; Ryota Ohashi, all of Amagasaki (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 0 days.

(21) Appl. No.: 09/756,235

(22) Filed: Jan. 9, 2001

Related U.S. Application Data

(62) Division of application No. 09/119,631, filed on Jul. 21, 1998.

(30) Foreign Application Priority Data

Jul. 22, 1997 (JP) .............................. 9-195998
Jul. 25, 1997 (JP) .............................. 9-200403

(51) Int. Cl.$^7$ .......................................... B60K 17/356
(52) U.S. Cl. ........................................ 180/242; 180/305
(58) Field of Search ............................. 180/242, 243, 180/247, 248, 305, 307

(56) References Cited

U.S. PATENT DOCUMENTS

| | | | |
|---|---|---|---|
| 3,702,642 A | 11/1972 | Greene | |
| 3,874,470 A | 4/1975 | Greene | |
| 3,913,697 A | 10/1975 | Greene | |
| 3,994,353 A | 11/1976 | Greene | |
| 4,399,886 A | 8/1983 | Pollman | |
| 4,771,852 A | 9/1988 | Nishikawa et al. | |
| 4,886,142 A | 12/1989 | Yamaoka et al. | |
| 4,991,678 A | 2/1991 | Furuya et al. | |
| 5,074,580 A | * 12/1991 | Wagner et al. | 280/679 |
| 5,080,187 A | 1/1992 | Asano et al. | |
| 5,687,808 A | 11/1997 | Watanabe et al. | |
| 6,059,064 A | 5/2000 | Nagano et al. | |
| 6,196,348 B1 | * 3/2001 | Yano et al. | 180/242 |

FOREIGN PATENT DOCUMENTS

| | | |
|---|---|---|
| GB | 2136371 | 9/1984 |
| JP | 60-32127 | 3/1985 |
| JP | 60-139533 | 7/1985 |
| JP | 9-121645 | 5/1997 |

* cited by examiner

Primary Examiner—Robert P. Olszewski
Assistant Examiner—Michael Cuff
(74) Attorney, Agent, or Firm—Sterne, Kessler, Goldstein & Fox P.L.L.C.

(57) ABSTRACT

A first hydraulic pump P1 driven by power of an engine and a first hydraulic motor M1 are fluidly connected so as to form a closed fluid circuit. An output shaft 2 of first hydraulic motor M1 is drivingly connected with a sub-transmission 3. The output power from sub-transmission 3 drives main-driving wheels 5 and also drives a second hydraulic pump P2 fluidly connected with a second hydraulic motor M2 for driving sub-driving wheels 6. A clutch 7 is interposed between an output shaft 4 of sub-transmission 3 and an input shaft 9 of second hydraulic pump P2 or on the output side of second hydraulic motor M2. Second hydraulic pump P2 or second hydraulic motor M2 has variable displacement, so that second hydraulic motor M2 is drivingly accelerated in proportion to the degree of turning operation of a steering operating tool 31. In case that a plurality of front reel mowers 8FL, 8FM and 8FR are disposed in front of the vehicle body, a pair of decelerator casings 29 are disposed on both lateral sides of transmission casing 1 for driving main-driving wheels 5. Decelerator casings 29 project horizontally forward and support main-driving wheels 5 respectively at their front portions. Middle front reel mower 8FM is disposed between left and right decelerator casings 29.

7 Claims, 19 Drawing Sheets

DRIVING SYSTEM FOR A WORKING VEHICLE

CROSS-REFERENCE TO RELATED APPLICATION

This application is a divisional of U.S. application Ser. No. 09/119,631, filed Jul. 21, 1998 (allowed).

BACKGROUND OF THE INVENTION

1. Field of the Invention

The present invention relates to a driving system for a four-wheel drive working vehicle comprising a hydrostatic transmission (an HST) for driving main-driving wheels, a hydraulic pump, and one or more hydraulic motors for driving sub-driving wheels, wherein output power from the hydraulic motor of the HST for the main-driving wheels is partly transmitted to the hydraulic pump for the sub-driving wheels through another transmission. The present invention also relates to a construction for decelerating the main-driving wheels, wherein a working machine is provided in front of a vehicle body.

2. Related Art

Japanese Utility Model Laid-Open No. Sho 60-32127, for example, discloses a conventional four-wheel drive vehicle provided with an HST. An engine drives a hydraulic motor through a hydraulic pump fluidly connected with the hydraulic motor. The hydraulic motor transmits power to a differential gear unit through a mechanical sub-transmission for the purpose of driving main-driving wheels (rear wheels or front wheels). The hydraulic motor also partly transmits power to another differential gear unit through a transmitting shaft for the purpose of driving sub-driving wheels (front wheels or rear wheels).

Also, Japanese Laid-Open No. Hei 9-121645, for example, discloses a conventional working vehicle having a working machine such as a mower provided either in front of the vehicle body or at its venter portion between its front wheels and rear wheels.

In this conventional construction, the rotary speed of the sub-driving wheels is different from that of the main-driving wheels because the main-driving wheels receive the transmitted power through the sub-transmission. Thus, a problem exists whereby the faster wheels, which are either the main-driving wheels or the sub-driving wheels (the front wheels or the rear wheels), drag the other wheels and a working machine provided on the vehicle. This can cause significant injury to the ground surface (e.g., of a farm), especially if the working vehicle is provided with a mower.

Even if the rotary speeds of the main-driving wheels and the sub-driving wheels (front and rear wheels) are equalized, the four-wheel drive working vehicle turns around an inside main-driving wheel. Therefore, the rotary speed of both sub-driving wheels, which are rather apart from the inside main-driving wheel, slows down so as to be dragged. When the working vehicle travels in two-wheel drive, where only the main-driving wheels are driven, if one of either the left or the right main-driving wheels runs idle, the other main-driving wheel slips because it cannot receive the driving power. This also can cause injury to the ground surface.

For the latter construction, a plurality of mowers are occasionally juxtaposed on a lateral row (arranged on in the center, one on the left and one on the right, for example), so that they can cut the grass in a wide lateral range. In this case, the mowers overlap one another when viewed from the front, so as to leave no uncut grass.

Consequently, these mowers do not overlap when viewed from the side. This causes the size of the working vehicle to increase longitudinally. Furthermore, a center mower of the arrangement must be vertically and movably suspended by a long arm. Accordingly, it is necessary to reinforce the strength of the arm and the lifting power thereof, especially when the center mower is disposed at the fore-end of the vehicle body (before left and right mowers). Additionally, for preventing the vehicle with the mowers from turning along a large turning radius, the overlapping portions of the center mower with the left and right mowers are necessarily lengthened, thereby causing much unevenness of the cut between the portion where the mowers overlap and the portion where they do not overlap.

Where the mower is disposed at the center portion of the working vehicle between the front wheels and the rear wheels, a transmitting shaft is necessarily interposed between the output shaft of the hydraulic motor and the differential gear unit of the sub-driving wheels (front wheels or rear wheels), thereby restricting the space for disposal of the mower.

SUMMARY OF THE INVENTION

The first object of the present invention is to provide a driving system which can prevent a working vehicle that is provided with a working machine such as a mower from injuring the ground surface (e.g., of a farm), especially while the working vehicle is turning.

To achieve the first object, in the case of a four-wheel drive working vehicle, a first hydraulic pump driven by the power of an engine and a first hydraulic motor for driving the main-driving wheels are fluidly connected with each other through a closed fluid circuit. This arrangement allows the rotary speed of the sub-driving wheels to correspond to the rotary speed of the main-driving wheels and prevents the working vehicle from dragging the working machine, especially during turning. An output shaft of the first hydraulic motor is drivingly connected with a transmission, so that power transmitted through the transmitting mechanism is given to a first differential gear unit for driving the main-driving wheels and a second hydraulic pump for driving both sub-driving wheels. The second hydraulic pump is fluidly connected to a second hydraulic motor, which is drivingly connected with a second differential gear unit for the sub-driving wheels. The second hydraulic pump or the second hydraulic motor has variable displacement. A displacement adjusting means like a swash plate of the hydraulic pump or the second hydraulic motor is connected with a steering operating tool, so that the rotary speed of the sub-driving wheels can correspond to the degree of turning operation of the steering operating tool.

Alternatively, the second hydraulic pump may be fluidly connected with a pair of second hydraulic motors, which respectively drive left and right axles of the sub-driving wheels without the second differential gear unit. The second hydraulic pump or the pair of second hydraulic motors have variable displacement. A displacement adjusting means like a swash plate of the hydraulic pump or those of the pair of second hydraulic motors are connected with a steering operating tool, so that the rotary speed of the sub-driving wheels can correspond to the degree of turning operation of the steering operating tool.

In the construction wherein the pair of second hydraulic motors are provided, the second hydraulic pump and the pair of second hydraulic motors may also have fixed displacement. In this case, the steering operating tool is connected with a flow control valve unit by oil passages interposed between the second hydraulic pump and the pair of second hydraulic motors, such that the oil displacements of the pair of second hydraulic motors can be controlled by turning operation of the steering operating tool.

The second object of the present invention is to enable a two-wheel drive working vehicle employing the above mentioned driving system to quickly recover from being stuck due to the slipping of both or either of the main-driving wheels while the vehicle is turning.

To achieve the second object, when the working vehicle employing the above mentioned driving system, which can be switched between four-wheel drive and two-wheel drive, is set in two-wheel drive, the driving power of the output shaft of the first hydraulic motor, which has been transmitted through the transmission, is given to the main-driving wheels and is also given to the sub-driving wheels through a clutch. The clutch acts as an over running clutch or a manual clutch, and is interposed between an output shaft of the first hydraulic motor and an input shaft of the second hydraulic pump or on the output side of the second hydraulic motor (output sides of the pair of second hydraulic motors).

The third object of the present invention is to enable a working vehicle employing the driving system of the first object to be light and to be longitudinally short or laterally narrow, thereby providing a small turning radius. Additionally, the object is to allow a working vehicle loaded in front of its vehicle body (its pair of front wheels) with a working machine such as a mower to provide the support and the driving power for vertical moving thereof.

To achieve the third object, the driving system for a working vehicle is further constructed so that both of the output shafts of the first hydraulic motor and the transmission, which are contained in a transmission casing, are disposed in a longitudinal direction of the vehicle so as to drive the first differential gear unit for the main-driving wheels through bevel gears. This construction reduces the lateral width of the transmission casing. Alternatively, both of the output shafts of the first hydraulic motor and the transmission are disposed in a lateral direction of the vehicle so as to drive the first differential gear unit for the main-driving wheels, thereby reducing the longitudinal length of the transmission casing.

Alternatively, in cases where the working machine is disposed in front of the vehicle body, a pair of decelerator casings are disposed respectively on both outer lateral sides of the left and the right front axle casings, so as to project substantially forward in the horizontal direction. Wheel shafts are supported respectively by front portions of the decelerator casings and the pair of main-driving wheels are attached respectively to the wheel shafts. The working machine is disposed between the left and the right decelerator casings, thereby reducing the longitudinal length of the vehicle body and providing the support and the driving power for its vertical moving.

The fourth object of the present invention is to provide a working vehicle with an expanded space at the center portion of the vehicle body between its front and rear wheels for disposal of a working machine such as a mower.

To achieve the fourth object, the second hydraulic pump for driving the sub-driving wheels, which receives the output power of the first hydraulic motor through the transmission, is fluidly connected without a transmitting shaft to the second hydraulic motor, which is drivingly connected with the second differential gear unit for the sub-driving wheels. Also, each of the decelerator casings contains a reduction gear train interposed between the first differential gear unit, which is contained in the front axle casing, and each of the main-driving wheels, so as to reduce the ratio of deceleration of the first differential gear unit, thereby compacting the front axle casing. Thus the space at the center portion of the vehicle body between the front and rear wheels can be advantageously expanded for disposal of the working machine.

DETAILED DESCRIPTION OF THE PREFERRED EMBODIMENTS

Figure 1:
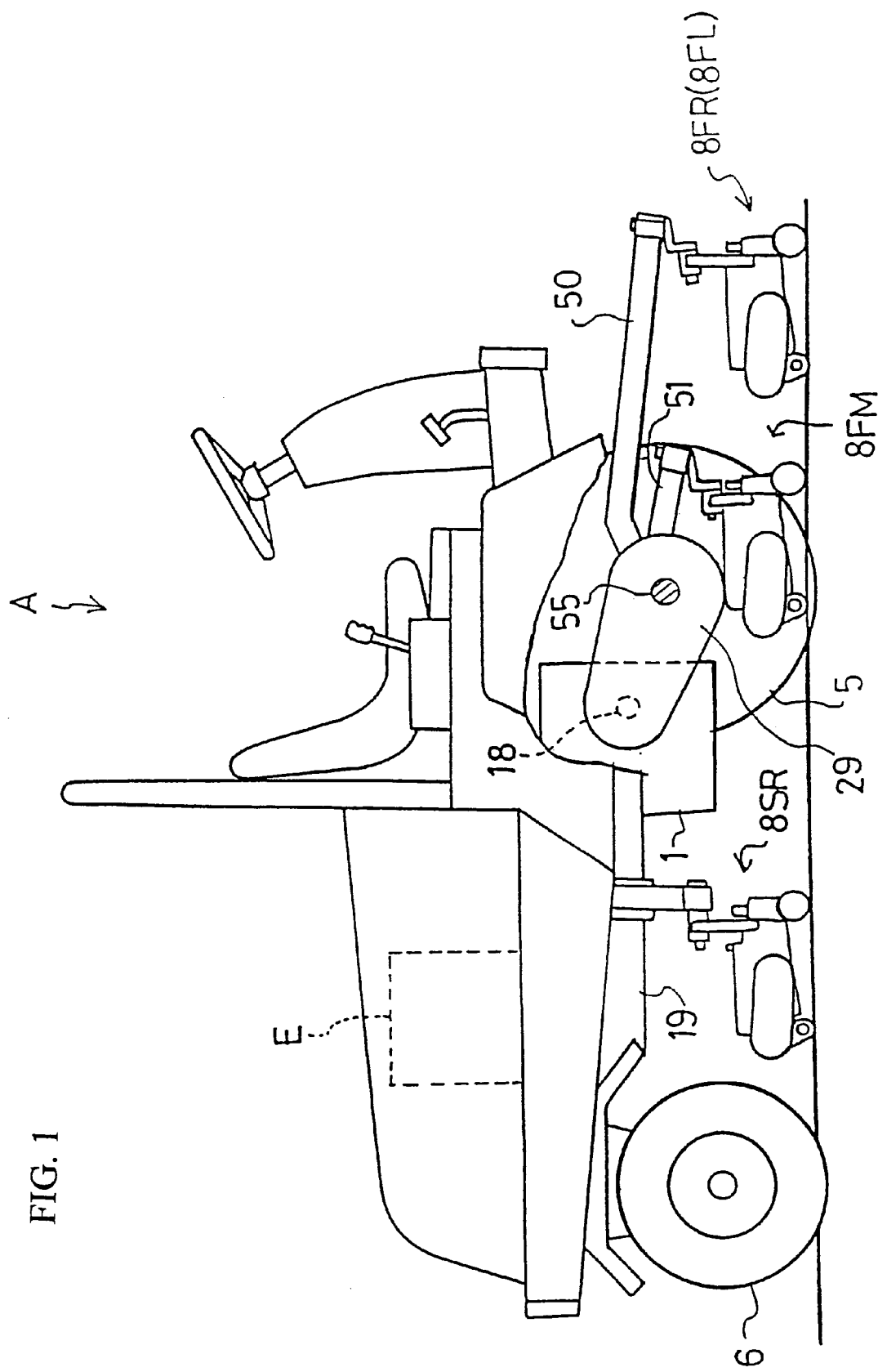
FIG. 1 is a side view of the whole of a working vehicle, which employs a driving system of the present invention, provided with mowers as working machines.

Explanation will be given on an embodiment wherein the driving system of the present invention is employed by a mower tractor. As shown in FIG. 1 and others, a pair of front wheels are the main-driving wheels 5 and a pair of rear wheels are the sub-driving wheels 6, which are also used as wheels for steering. Main-driving wheels 5 are supported at a front portion of a vehicle body frame 19 and sub-driving wheels 6 are supported at a rear portion thereof. Triple front reel mowers 8FL, 8FM and 8FR are vertically and movably disposed in front of the mower tractor. Double left and right side reel mowers 8SL and 8SR are vertically and movably disposed between main-driving wheels 5 and sub-driving wheels 6. With regard to triple front reel mowers 8FL, 8FM and 8FR, the left and right front reel mowers 8FL and 8FR (a pair of side front reel mowers) project forward from the front end of the vehicle body and the lateral middle front reel mower (a middle front reel mower) 8FM is disposed behind the both of side front reel mowers 8FL and 8FR. In some cases, only the middle front reel mower 8FM may be used. Above the front portion of vehicle body frame 19 is disposed an operating portion A and behind the rear portion thereof is disposed an engine E covered with a bonnet.

Figure 2:
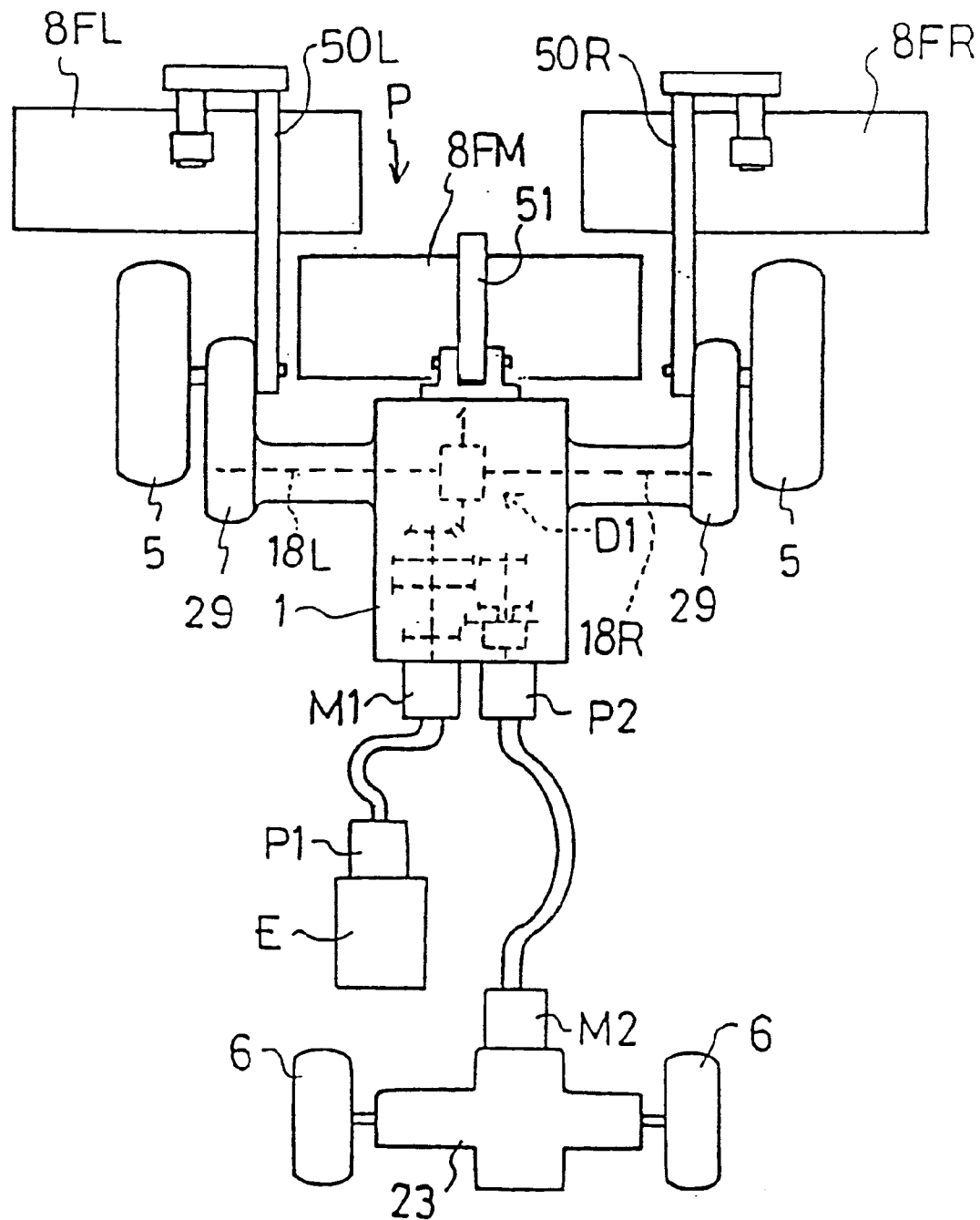
FIG. 2 is a schematic plan view of a working vehicle provided with mowers, employing a basic driving system of a first group according to the present invention.
Figure 3:
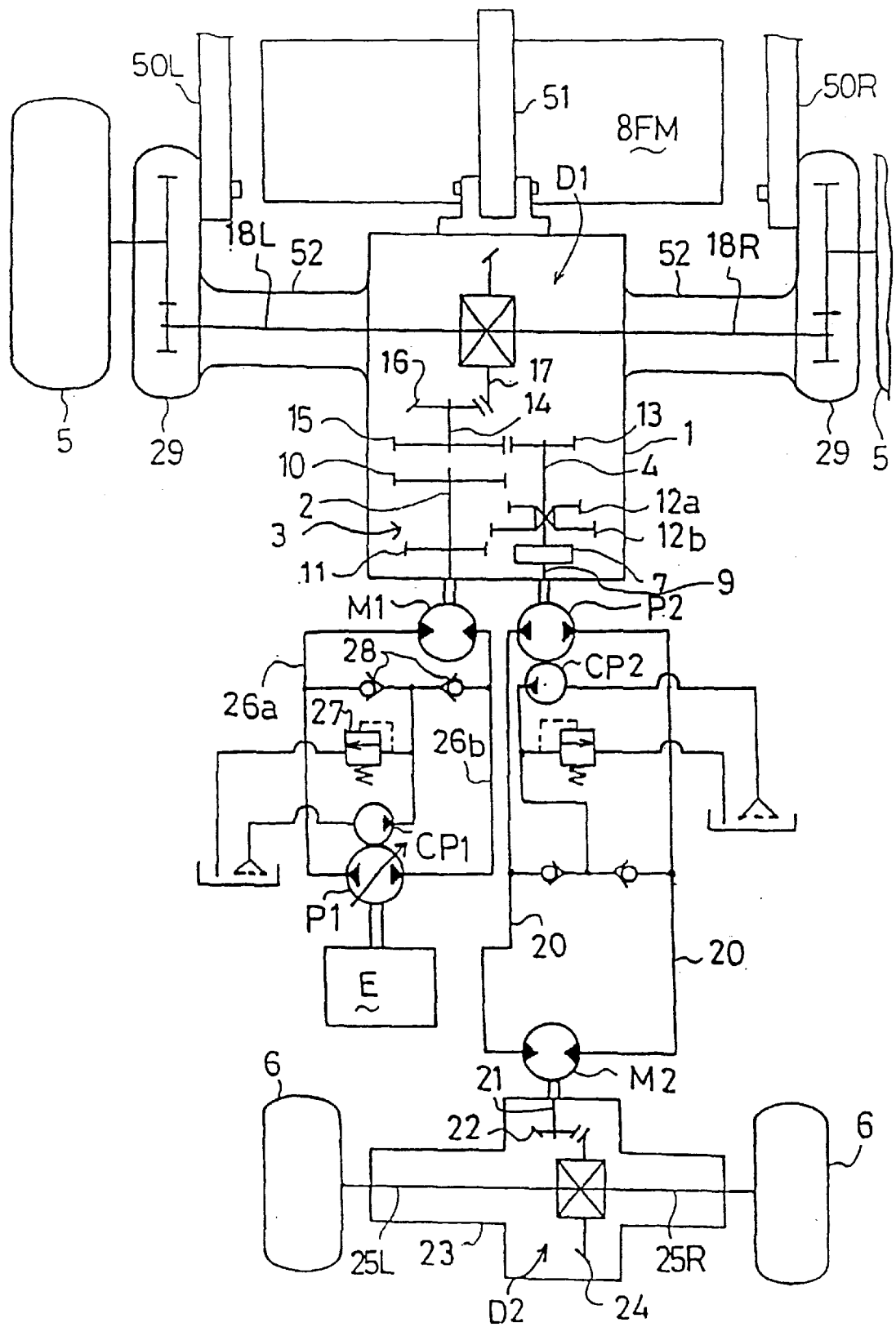
FIG. 3 is an oil circuit diagram of the same driving system shown in FIG. 1.

As shown in FIGS. 1 to 3, each of the left and right axle casings 52 is fixed onto each of the left and right sides of a transmission casing 1 and contains each of the left and right axles 18L, and 18R. Each of the left and right decelerator casings 29 containing the reduction gear (bull gear) train is disposed on the outer end of each axle casing 52 so that the reduction gear train is interposed between each of axles 18L and 18R and each of the main-driving wheels 5. According to this construction, the ratio of deceleration by a first differential gear unit D1 can be so small as to reduce the transmitting torque thereof, thereby enabling first differential gear unit D1 to be minimized. Also, the width between treads of main-driving wheels 5 can be changed by means of interposition of decelerator casings 29.

Transmission casing 1, the left and right axle casings 52, and the left and right decelerator casings 29 are arcuately arranged when viewed in plan, so as to create a space P between the pair. Middle front reel mower 8FM is disposed in space P so as to be between the left and right front wheels (main-driving wheels 5). Thus, when triple front reel mowers 8FL, 8FM and 8FR are disposed at the front portion of the vehicle body, the whole of the working vehicle provided with them can be longitudinally short. Also, an arm for lifting middle front reel mower 8FM can be short, and lifting mechanisms for vertically and movably suspending left and right front reel mowers 8FL and 8FR can be disposed in space P so as to be protected. Thus, space P between decelerator casings 29 can be advantageously utilized. Also, the balance of weight of the mower tractor can be improved so as to stabilize its durability in travel because of the disposal of middle front reel mower 8FM at the center of the vehicle body.

Axle casings 52 may be integrally formed at the left and right sides of transmission casing 1, or may be integral with decelerator casings 29.

Figure 20:
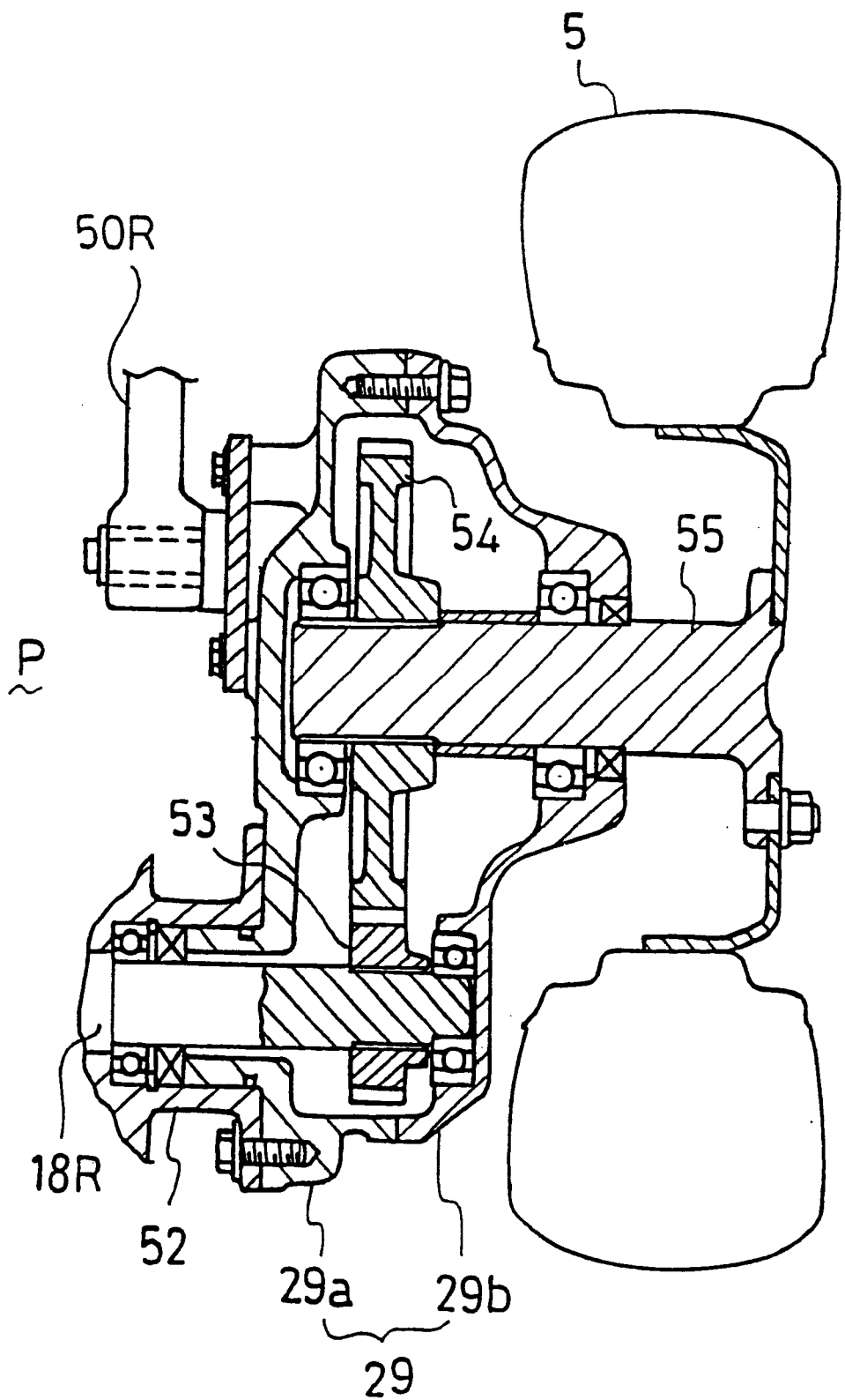
FIG. 20 is a sectional plan view of a decelerator.

As shown in FIGS. 2, 3 and 20, decelerator casings 29 project substantially forward in the horizontal direction. They can also be disposed substantially in the vertical direction so as to raise the level of axles; however, the working vehicle of this embodiment provided for lawn mowing prefers low axles so as to have a low center of gravity. Thus, decelerator casings 29 are disposed substantially in the horizontal direction, thereby enabling the vehicle provided with the mower or mowers to travel and work easily and steadily on a slope or the like.

Basic portions of vertically moving links 50L and 50R, which vertically and movably suspend front side reel mowers 8FL and 8FR respectively, are pivoted onto the inner sides of decelerator casings 29 respectively. Vertically moving links 50L and 50R are vertically rotated by a hydraulic cylinder (not shown). Vertically moving links 50L and 50R can be shorter as decelerator casings 29 project more forward. They also require no bracket for attachment thereof. A vertically moving link 51 is pivoted at its basic portion onto the front surface of transmission casing 1 and can be vertically rotated by a hydraulic cylinder. Middle front reel mower 8FM is suspended from an utmost end of vertically moving link 51, which is rotatably supported at its basic portion by the front portion of transmission casing 1, so as to be vertically rotated by operation of a hydraulic cylinder.

As shown in FIG. 20, each decelerator casing 29, which can be laterally separated into a left half casing 29a and a right half casing 29b, is fixed onto an outer end of each axle casing 52. An utmost end portion of axle 18 (which is axle 18L or 18R) is inserted into a rear portion of decelerator casing 29 and is rotatably supported by a bearing. With regard to the interior of decelerator casing 29, a small diametric gear 53 is fixed onto the utmost end portion of axle 18. At a front space between the inner sides of left and right half casings 29a and 29b of decelerator casing 29 is rotatably supported a wheel shaft 55 through bearings. A large diametric gear 54 is fixed onto an inner end portion of wheel shaft 55 and always engages with small diametric gear 53, thereby constructing a reduction gear train. An outer end portion of wheel shaft 55 projects laterally outward from decelerator casing 29, such that main-driving wheel 5 is fixed onto the outer projecting portion of wheel shaft 55.

The ratio of deceleration by first differential gear unit D1 can be reduced because of the reduction gear trains contained in decelerator casings 29, thereby reducing the torque for transmitting by first differential gear unit D1. Thus, first differential gear unit D1 can be compacted, so as to raise the bottom level of the vehicle, thereby expanding space P in its longitudinal direction and the space between front and rear wheels. Also, the width between both treads of main-driving wheels 5 can be extended because of the interposition of decelerator casings 29 or axle casings 52 and can be adjusted if various kinds of decelerator casings 29 are prepared.

Next, explanation will be given on various embodiments of driving systems for driving of main-driving wheels 5 and sub-driving wheels 6 as follows. In this regard, the driving systems of the following embodiments are roughly classified into first and second groups. For the purpose of driving sub-driving wheels 6, each driving system of the first group uses a single second hydraulic motor M2 and a second differential gear unit D2, and each driving system of the second group uses a pair of second hydraulic motors M3.

First, a construction of a first HST, which is common in the driving systems of both the first and second groups will be described in accordance with FIGS. 3 to 5. As shown in FIG. 3, a first hydraulic pump P1 with variable displacement is connected to an output shaft of engine E. A first hydraulic motor M1 with fixed displacement is attached to transmission casing 1. First hydraulic pump P1 and first hydraulic motor M1 are fluidly connected with each other through oil passages like pipings, so as to constitute the first HST. An output shaft of first hydraulic pump P1 is connected with an input shaft 2 supported by transmission casing 1.

With regard to the interior of transmission casing 1, a sub-transmission 3, which can be shifted stepwise, is contained therein. As shown in FIG. 3, for example, sub-transmission 3 is so constructed that a large diametric gear 10 and a small diametric gear 11 are fixed onto input shaft 2 and double slidable gears 12 are provided on output shaft 4 so as to engage with it through a spine, thereby being axially slidable and not relatively rotatable. When a gear 12a of double slidable gears 12 engages with large diametric gear 10, output shaft 4 is rotated quickly. When the other gear 12b thereof engages with small diametric gear 11, output shaft 4 is rotated slowly. Thus, sub-transmission 3 can be shifted between two steps of high and low speed states; however, it is not restricted to having two speed steps. On the contrary, it may also have only one gear pattern or more than two gear patterns, or may be also steplessly shifted.

A gear 13 is fixed onto one end of output shaft 4 and engages with a gear 15 provided on a deceleration shaft 14. Bevel gear 16 is also fixed onto deceleration shaft 14 and engages with a ring gear 17 of first differential gear unit D1. Axles 18L and 18R project from first differential gear unit D1 and main-driving wheels 5 are drivingly connected respectively to the utmost ends of axles 18L and 18R. Accordingly, the driving power transmitted from first hydraulic motor M1 to output shaft 4 through sub-transmission 3 further drives first differential gear unit D1 through gears 13 and 15 and bevel gear 16, thereby driving main-driving wheels 5.

Other embodiments concerning an inner construction of transmission casing 1 will be described in accordance with FIGS. 4 and 5. In the above mentioned embodiment shown in FIG. 2, transmission casing 1 contains input shaft 2, output shaft 4, and input shaft 9, which are arranged perpendicularly to axles 18L and 18R. In other words, they are arranged in a longitudinal direction of the vehicle. In the embodiments shown in FIGS. 4 and 5, input shaft 2, output shaft 4 and input shaft 9 are arranged in parallel to axles 18L and 18R. In other words, they are arranged in a lateral direction of the vehicle. Also, plain gear 16' and plain ring gear 17' are provided respectively instead of bevel gear 16 and bevel ring gear 17 of first differential gear unit D1. The other components are similarly structured, as shown in FIG. 2.

Figure 4:
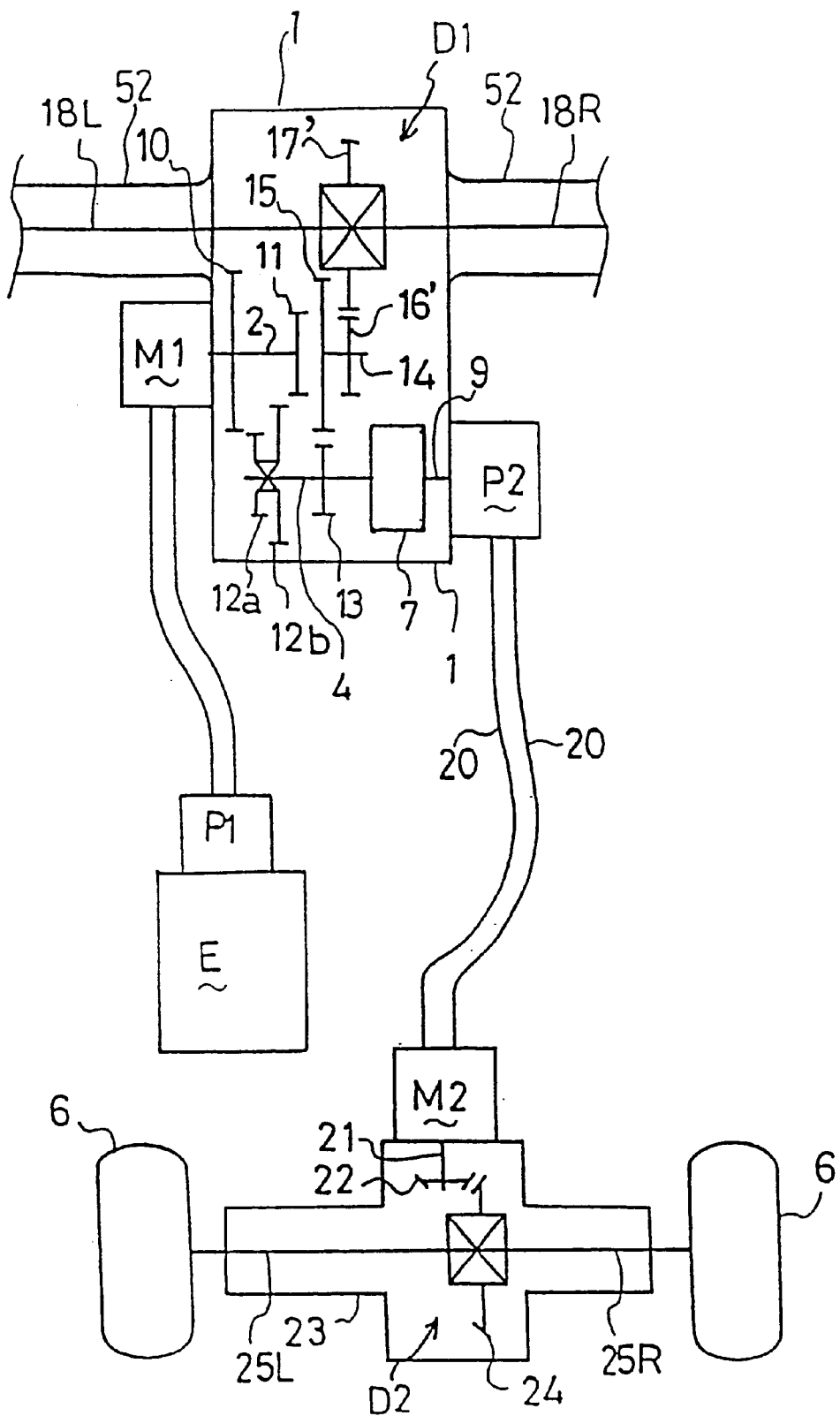
FIG. 4 is a diagram of the same driving system, concerning the arrangement of shafts in a transmission casing 1.

With regard to the disposal of hydraulic pump P1 and motor M1, as shown in FIG. 4, each is disposed apart from the other respectively on both lateral outer sides of transmission casing 1. On the other hand, with regard to the disposal of hydraulic pump P1 and motor M1, as shown in FIG. 5, both are juxtaposed on one side of transmission casing 1.

Figure 5:
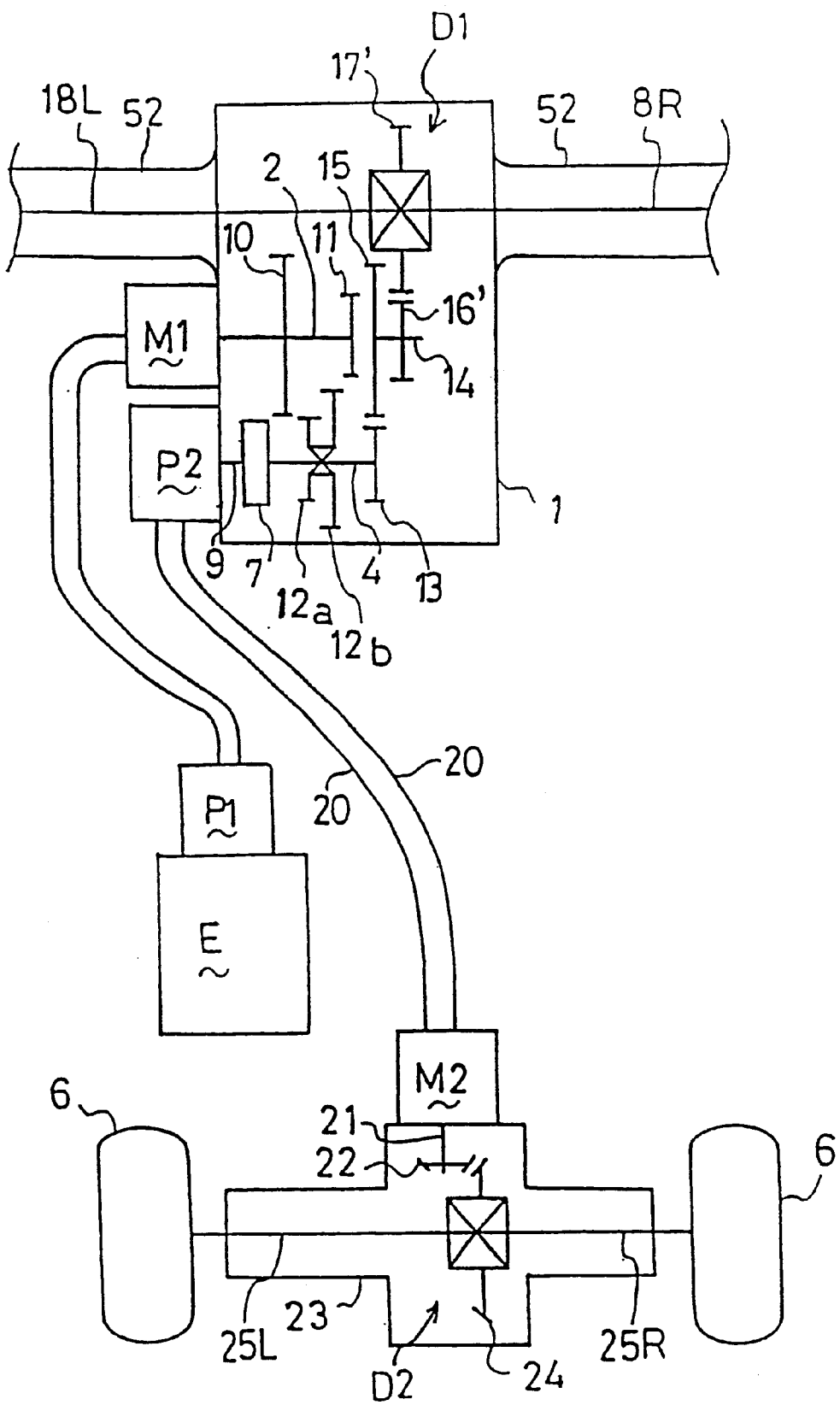
FIG. 5 is a diagram of the same driving system, also concerning the arrangement of shafts in a transmission casing 1.

Each of the above mentioned embodiments concerning the interior of transmission casing 1 is shown in FIGS. 3 to 5, employed by the driving system of the first group. However, the embodiments can be also employed by the driving systems of the second group.

As shown in FIG. 3, with regard to oil circuits of the first and second HSTs, first hydraulic pump P1 and a charge pump CP1 are driven simultaneously. Oil passages 26a and 26b are interposed between first hydraulic pump P1 and first hydraulic motor M1. A charge relief valve 27 is connected to a discharging oil passage of charge pump CP1 and to oil passages 26a and 26b through a pair of check valves 28, so as to supply the operating oil to the closed oil circuit of the first HST. Charge pump CP1 of the first HST can also drive a working machine by pressure oil discharged therefrom.

In such a construction, the rotary speed of output shaft 4 of first hydraulic pump P1 is steplessly changed by changing the slanting angle of a movable swash plate (as a displacement adjusting means) of first hydraulic pump P1. This allows main-driving wheels 5 to be rotated at the speed corresponding to the rotary speed of output shaft 4, thereby driving the vehicle.

Next, an explanation will be given on a second HST embodied in the driving systems of the first group. Output shaft 4 of sub-transmission 3 is drivingly connected with first differential gear unit D1 through gears, as mentioned above, so as to drive main-driving wheels 5. Output shaft 4 is also connected with an input shaft 9 of a second hydraulic pump P2.

Second hydraulic pump P2 is fluidly connected with second hydraulic motor M2 through a pair of pipings 20 forming a closed fluid circuit, thereby constituting the second HST. Second hydraulic pump P2 and motor M2 both may have fixed or variable displacements or they may be constructed so that one of them has variable displacement and the other has fixed displacement, depending on their relation to the other components.

The oil circuit of the second HST, which includes a charge pump CP2 among other elements, is constructed similarly to that of the first HST, as shown in FIG. 3.

A bevel gear 22 is fixed onto an output shaft 21 of second hydraulic motor M2 and engages with a ring gear 24 of a second differential gear unit D2 within a rear axle housing 23. Sub-driving wheels 6 are fixed respectively onto the outer ends of left and right axles 25L and 25R, projecting laterally from second differential gear unit D2.

Figure 6:
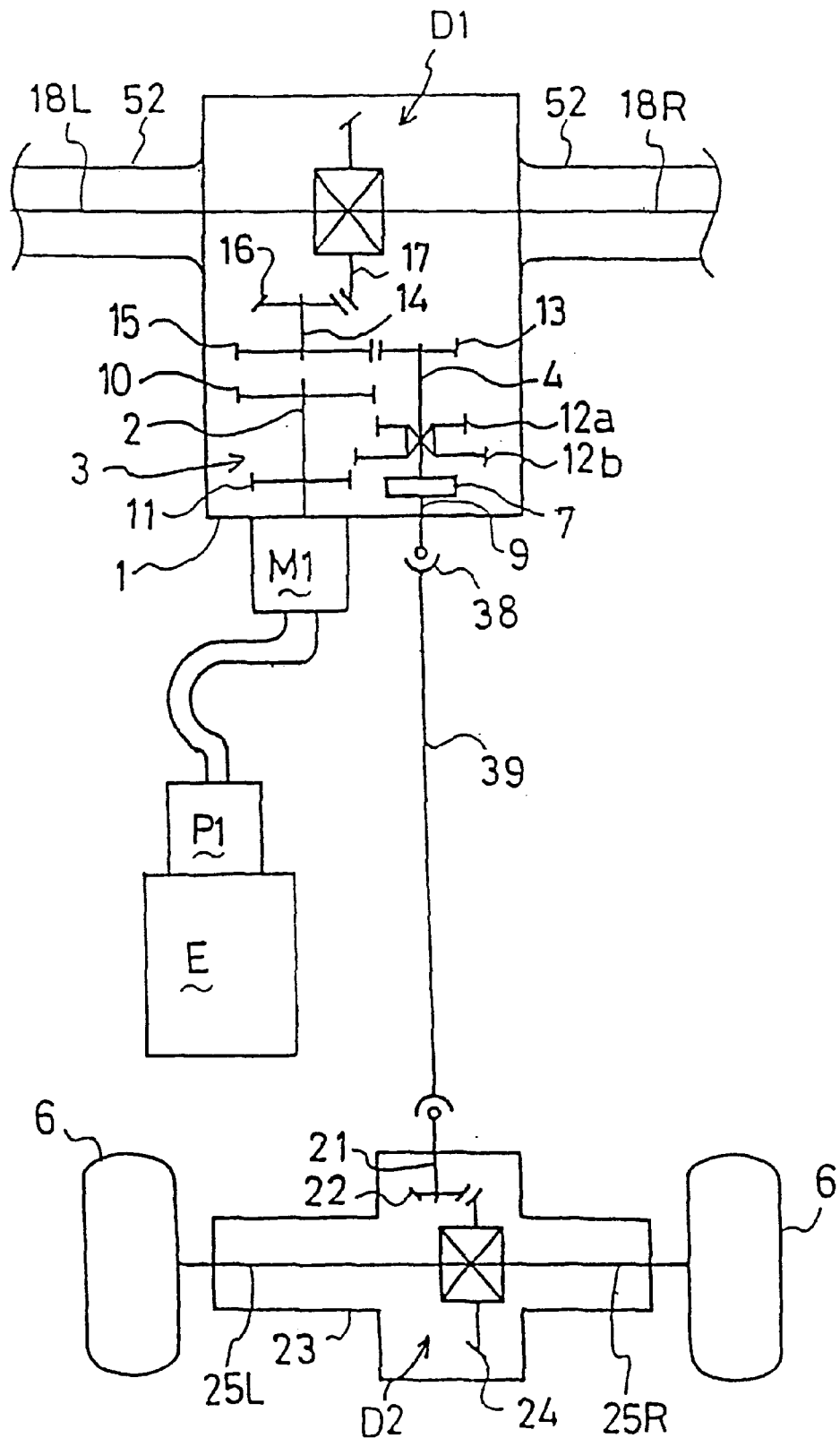
FIG. 6 is a diagram of an embodiment of the driving system including a transmitting shaft between transmission casing 1 and sub-driving wheels 6.

As shown in FIG. 6, a transmitting mechanism including a universal joint 38 and a transmitting shaft 39 may be interposed between a shaft on the output side of sub-transmission 3 (which is output shaft 9 on output side of clutch 7 in the embodiment shown in FIG. 6) and second differential gear unit D2 instead of the second HST. This construction simplifies the power transmitting system therebetween.

Next, construction of a clutch 7 will be described with respect to the driving system for sub-driving wheels 6. In the embodiments shown in FIG. 3 and others, clutch 7, acting as either an over-running clutch or a manual clutch, is interposed between output shaft 4 of sub-transmission 3 and input shaft 9 of second hydraulic pump P2 with fixed displacement.

Figure 7:
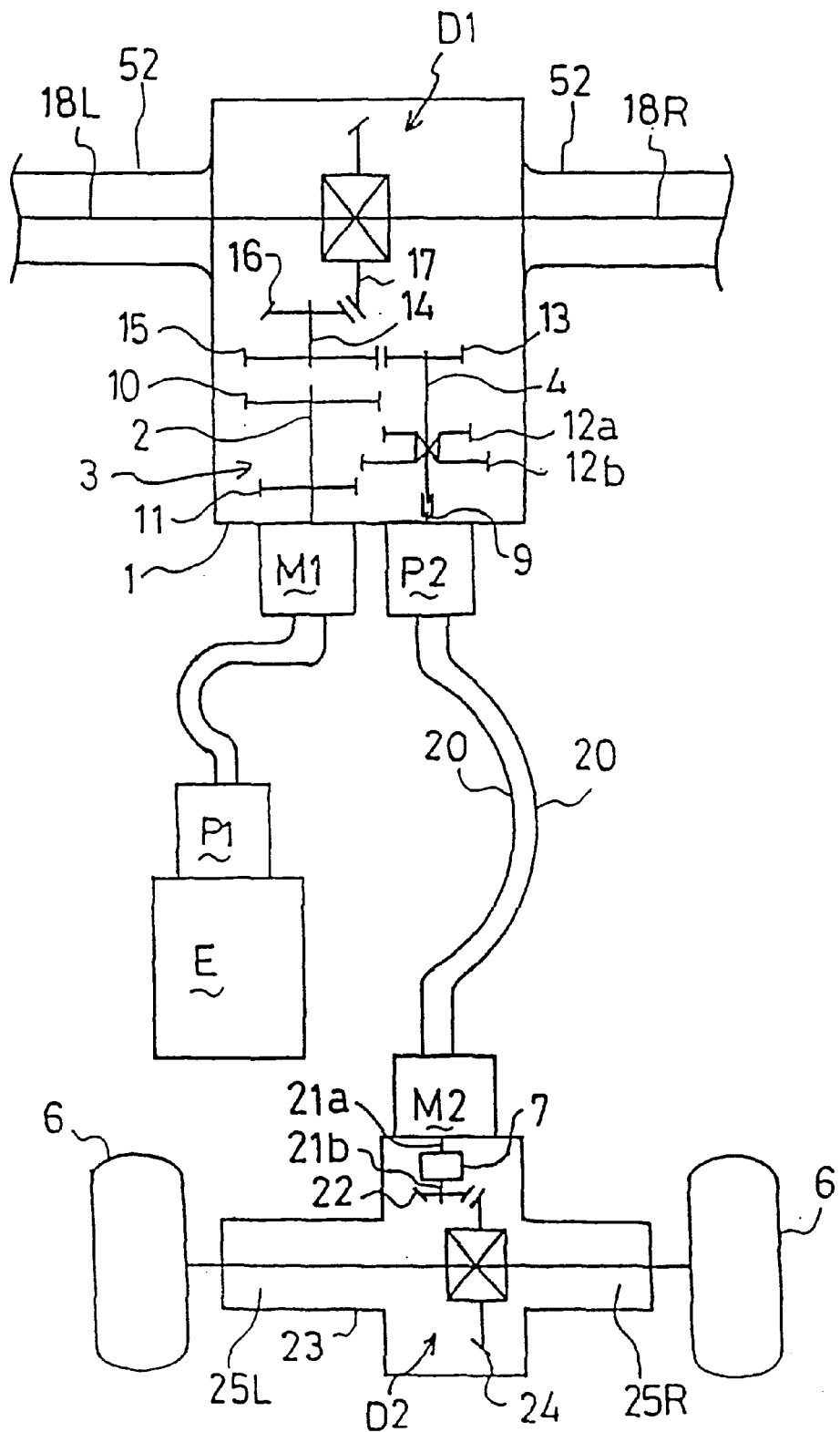
FIG. 7 is a diagram of a driving system of the first group, wherein a clutch 7 is disposed on the output side of a second hydraulic motor M2.

Alternatively, clutch 7, acting as an over-running clutch or a manual clutch, may also be disposed on the output side of second hydraulic motor M2 with fixed displacement, as shown in FIG. 7. In this case, output shaft 4 and input shaft 9 are directly connected with each other, such that second hydraulic motor M2 always drives when hydraulic pump P2 drives. Output (motor) shaft 21 of second hydraulic motor M2 is separated into a driving motor shaft 21a and a follower motor shaft 21b and they can be connected with each other through clutch 7. Follower motor shaft 21b, which is a shaft on the follower side of clutch 7, is connected with axles 25L and 25R through bevel gear 22, differential ring gear 24 and second differential gear unit D2.

Next, the operation of clutch 7 will be described. In cases where clutch 7, which is interposed between output shaft 4 and input shaft 9 as shown in FIG. 3, is an over-running clutch, clutch 7 engages between output shaft 4 and input shaft 9 when the rotary speed of input shaft 9 is slower than that of output shaft 4. This engagement occurs without regard to the rotary direction of the shafts (whether shafts 4 and 9 are rotated regularly or reversely). The shafts disengage when the rotary speed of input shaft 9 is the same as or faster than that of output shaft 4.

With regard to the driving of sub-driving wheels 6, sub-driving wheels 6 are rotated by friction against the ground surface when the vehicle travels. This rotation drives second hydraulic motor M2 and discharges pressure oil to second hydraulic pump P2, thereby driving its input shaft 9. Clutch 7, acting as an over-running clutch, automatically acts.

In this regard, clutch 7 engages when input shaft 9 rotates slower than output shaft 4 and disengages when input shaft 9 rotates at the same speed or faster than output shaft 4.

When the vehicle travels on a dry flat road, main-driving wheels 5 and sub-driving wheels 6 are rotated at the same speed without slipping. In this case, second hydraulic pump P2 and its input shaft 9 are driven by pressure oil discharged from second hydraulic motor M2, which is driven by the following rotation of sub-driving wheels 6. Clutch 7 automatically disengages between output shaft 4 and input shaft 9 because output shaft 4 is rotated faster than input shaft 9. Thus, second hydraulic pump P2 is not driven and sub-driving wheels 6 are prevented from dragging because they are not being driven. This prevents injury to the ground surface.

In travel, when one of main-driving wheels 5 falls in mud or a hollow and slips, the traveling speed of the vehicle is reduced whereas the rotary speed of output shaft 4 is kept. This causes the rotary speed of sub-driving wheels 6 to become slower relative to that of main-driving wheels 5. Accordingly, the driving speed of second hydraulic motor M2 is reduced, thereby decelerating input shaft 9 of second hydraulic pump P2. Thus, clutch 7 automatically engages between output shaft 4 and input shaft 9, such that second hydraulic pump P2 is driven by the rotation of output shaft 4. This causes the driving of second hydraulic motor M2. As a result, sub-driving wheels 6 are driven by second hydraulic motor M2, such that the vehicle travels in four-wheel drive, thereby allowing the vehicle to escape from mud or the like.

In cases where clutch 7, acting as an over running clutch, is disposed on the output side of second hydraulic motor M2 with fixed displacement as shown in FIG. 7, clutch 7 disengages when the rotary speed of driving motor shaft 21*a* is the same as or less than that of follower motor shaft 21*b*. Conversely, clutch 7 automatically engages when driving motor shaft 21*a* is rotated faster than follower motor shaft 21*b*. According to this construction, all of the four wheels are rotated at the same speed in normal travel, so that main-driving wheels 5 drive second hydraulic motor M2 through output shaft 4 and second hydraulic pump P2.

When clutch 7 automatically disengages, so that follower motor shaft 21*b* is not driven, the vehicle travels in two-wheel drive. When either or both of the main-driving wheels 5 slip, the traveling speed of the vehicle is reduced, such that the rotary speed of sub-driving wheels 6 becomes relatively slower as compared with that of main-driving wheels 5. Thus, clutch 7 automatically engages between driving motor shaft 21*a* and follower motor shaft 21*b,* thereby driving second differential gear unit D2. As a result, sub-driving wheels 6 are driven by second differential gear unit D2, so that the vehicle travels in four-wheel drive.

With regard to both embodiments shown in FIG. 3 and 7, clutch 7 may also act as a manual clutch, which can be switched on and off by manual operation of a lever. Alternatively, clutch 7 may also act as an electromagnetic clutch, which can be switched by operation of a switch.

Furthermore, clutch 7 may also be constructed so as to engage when the difference between the rotary speeds of the left and right axles 18L and 18R is recognized to be larger than the predetermined value detected.

Figure 8:
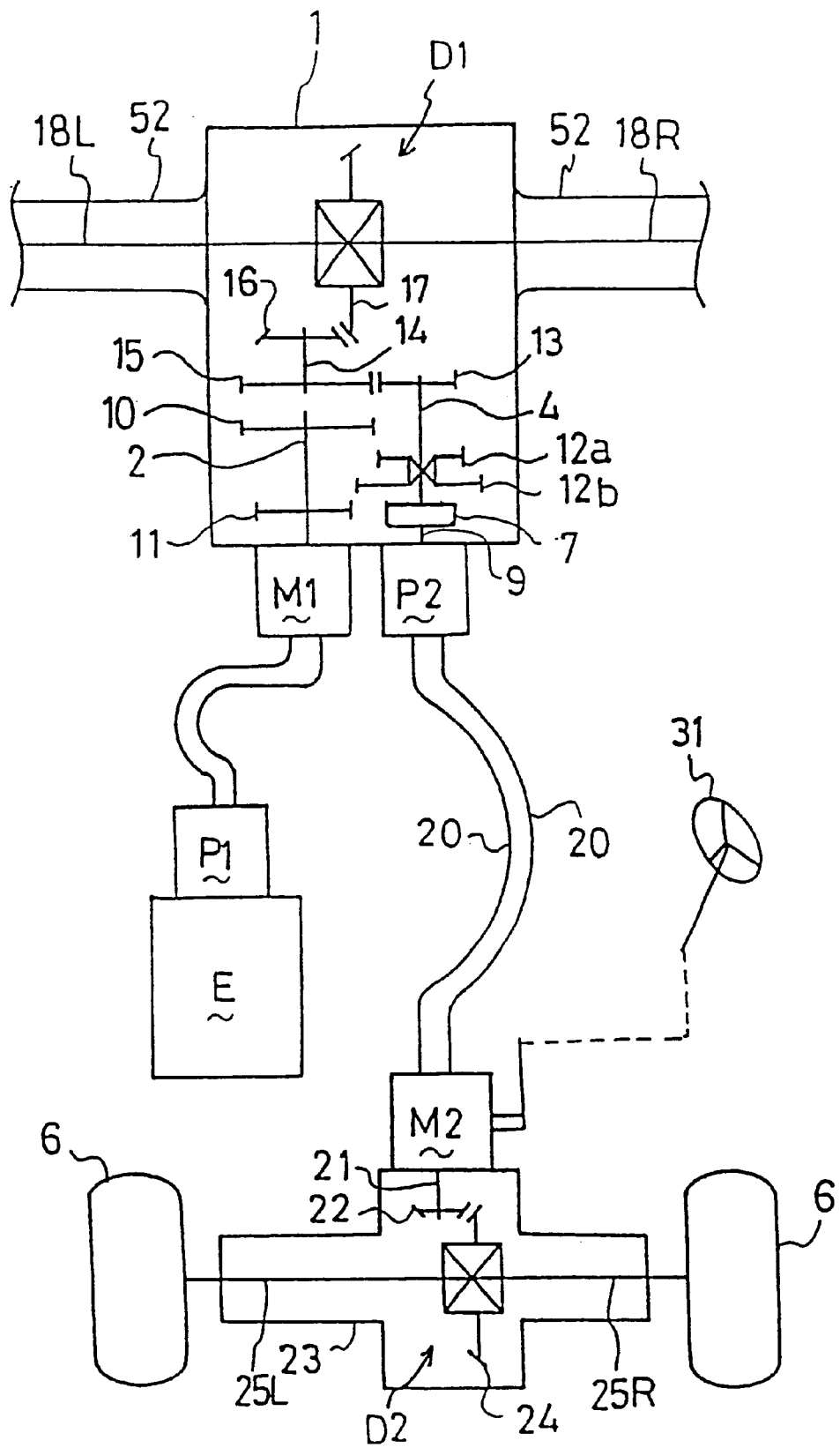
FIG. 8 is a diagram of a driving system of the first group, wherein the second hydraulic motor M2 is drivingly changed by the turning operation of a steering operating tool 31.

Next, embodiments of construction for avoiding dragging in turning will be described in accordance with FIGS. 8 and 9. For the embodiment shown in FIG. 8, clutch 7 is made as an electromagnetic clutch, which can be manually switched by operation of a switch or the like, or both of second hydraulic pump P2 and second hydraulic motor M2 of the second HST (in this embodiment, second hydraulic motor M2) have variable displacement. The electromagnetic clutch and a movable swash plate of second hydraulic pump P2 or motor M2 with variable displacement are connected to a steering operating tool (a steering wheel) 31.

According to such a construction, when the vehicle travels in two-wheel drive (only main-driving wheels 5 are driven), the electromagnetic clutch is unconnected, so that sub-driving wheels 6 are steered by operation of steering operating tool 31, similar to the conventional construction. When either or both of main-driving wheels 6 slip, the switch is turned on so as to connect the electromagnetic clutch, such that the vehicle travels in four-wheel drive and escapes. In this construction, an over-running clutch may also be provided in addition to the electromagnetic clutch, thereby requiring no manual operation to switch the clutch between two-wheel drive and four-wheel drive.

When the electromagnetic clutch is connected so as to strengthen the grip of the vehicle on the ground for the purpose of stead travel, unless the vehicle is stuck, the movable swash plate as a displacement adjusting means of second hydraulic motor M2 is shifted so as to coincide the rotary speed of sub-driving wheels 6 to that of main-driving wheels 5. In the turning operation of steering operating tool 31, the degree of slanting of the movable swash plate is reduced in inverse proportion to the degree of rotation of steering operating tool 31. This causes the sub-driving wheels 6 to be accelerated, thereby preventing them from being dragged.

Figure 9:
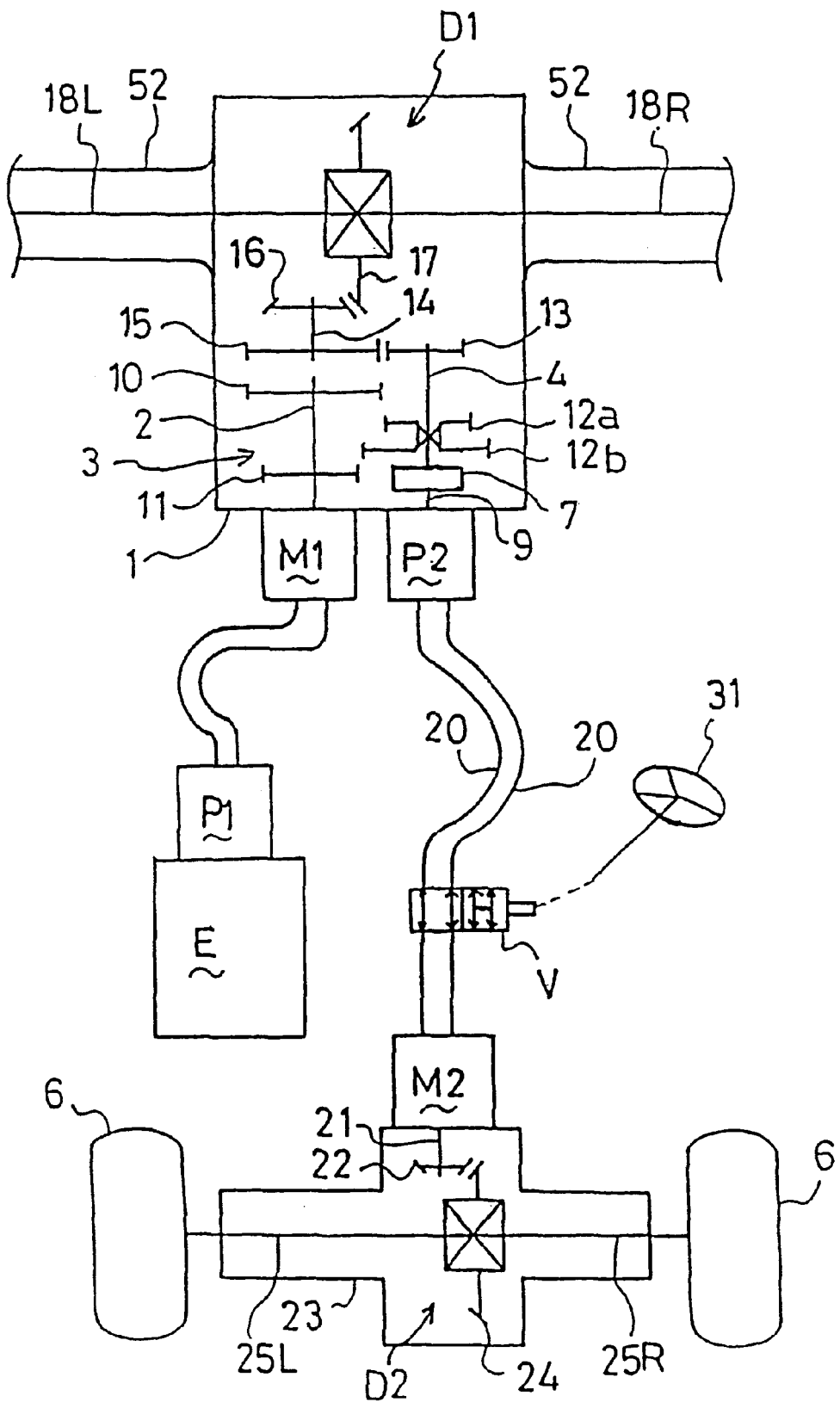
FIG. 9 is a diagram of another driving system of the first group, wherein the second hydraulic M2 is drivingly changed by the turning operation of steering operating tool 31.

For the embodiment shown in FIG. 9, both the second hydraulic pump P2 and motor M2 have fixed displacement. In addition, a bypass valve V is interposed between the pair of pipings 20, so as to be connected to steering operating tool 31. When steering operating tool 31 is rotated at an angle more than the predetermined angle for turning, bypass valve V is switched so as to communicate between pipings 20. Thus, second hydraulic motor M2 is changed to be neutral, causing the vehicle to turn in two-wheel drive. This operation prevents dragging, which is generated by a difference between the rotary speeds of main-driving wheels 5 and sub-driving wheels 6. In addition, means for detection of the oil pressure of pipings 20 may also be provided. Valve V is switched to communicate between pipings 20 when the oil pressure thereof is changed by the pumping operation of the rotation of second hydraulic motor M2 during turning.

Next, explanation will be given on a driving system for sub-driving wheels 6, namely a modified second HST, embodied in the driving system of the second group in accordance with FIGS. 10 to 19.

The modified second HST is so constructed that a pair of the left and right second hydraulic motors M3, which have variable or fixed displacement, are fluidly connected with second hydraulic pump P2 in parallel to each other, instead of second hydraulic motor M2 and differential gear unit D2. In this regard, an advancing oil passage 45a and a reversing oil passage 45b acting like pipings are extended from second hydraulic pump P2. Also, a pair of branching oil passages 45d are branched from each of the pair of oil passages 45a and 45b, so as to be connected respectively to left and right second hydraulic motors M3. Output shafts 30L and 30R project laterally from left and right second hydraulic motors M3. Output shafts 30L and 30R constitute axles as they are described above. Otherwise, they are directly connected at their outer end with axles, such that sub-driving wheels 6 are attached to the outer ends of the axles.

An over-running clutch or a manual clutch is used as clutch 7 similar to the clutch of the first group. For the embodiment shown in FIG. 10 and others, clutch 7 is interposed between output shaft 4 of subtransmission 3 and input shaft 9 of second hydraulic pump P2. For the embodiment shown in FIG. 11, a pair of clutches 7 are disposed on the output sides of left and right second hydraulic motors M3. In this regard, each of output shafts 30L and 30R are separated into a motor shaft 30a of second hydraulic motor M3 and an axle 30b onto which sub-driving wheel 6 is fixed. Each of the pair of clutches 7 is interposed between each of motor shafts 30a and each of axles 30b.

Figure 10:
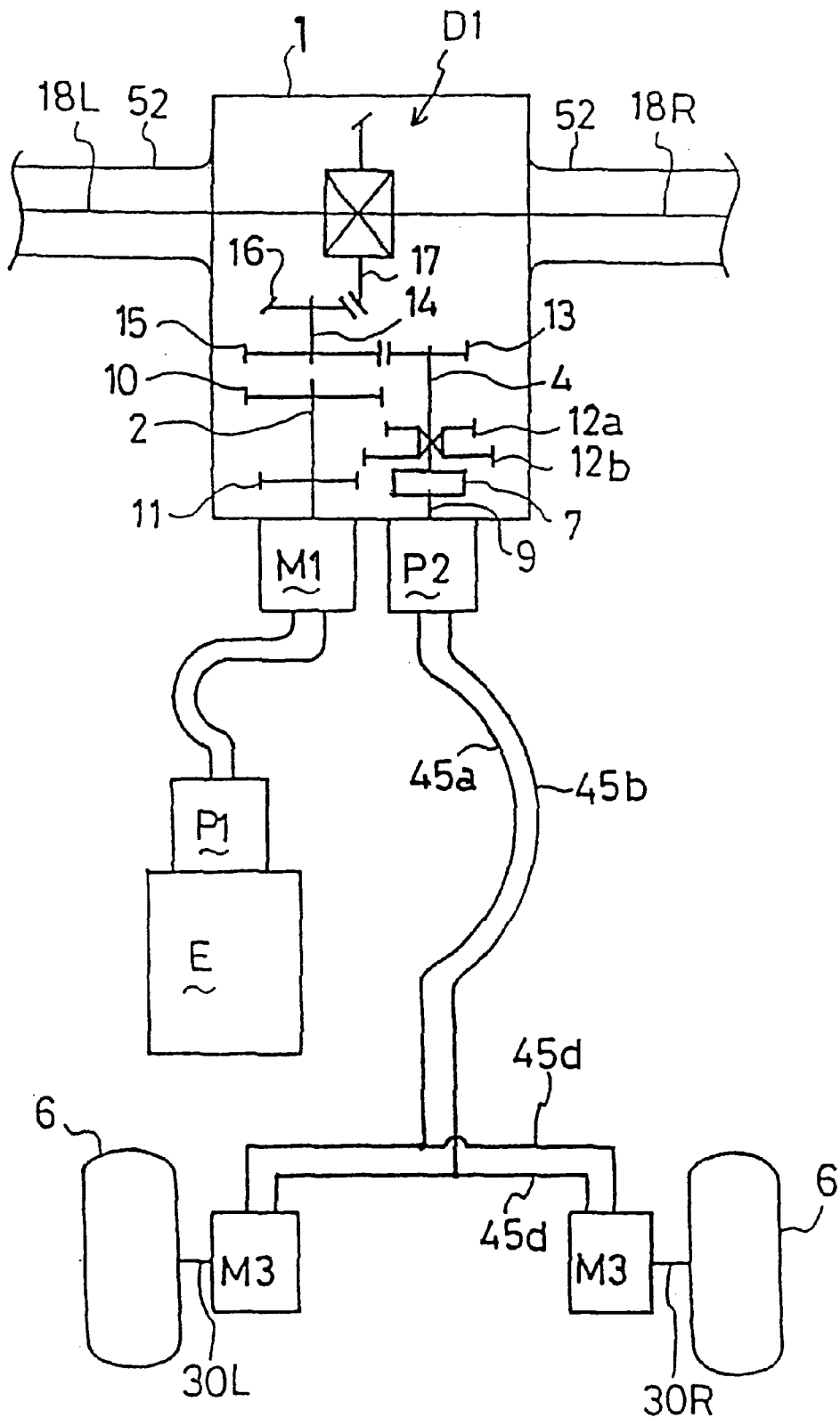
FIG. 10 is a diagram of a basic driving system of the second group according to the present invention.
Figure 11:
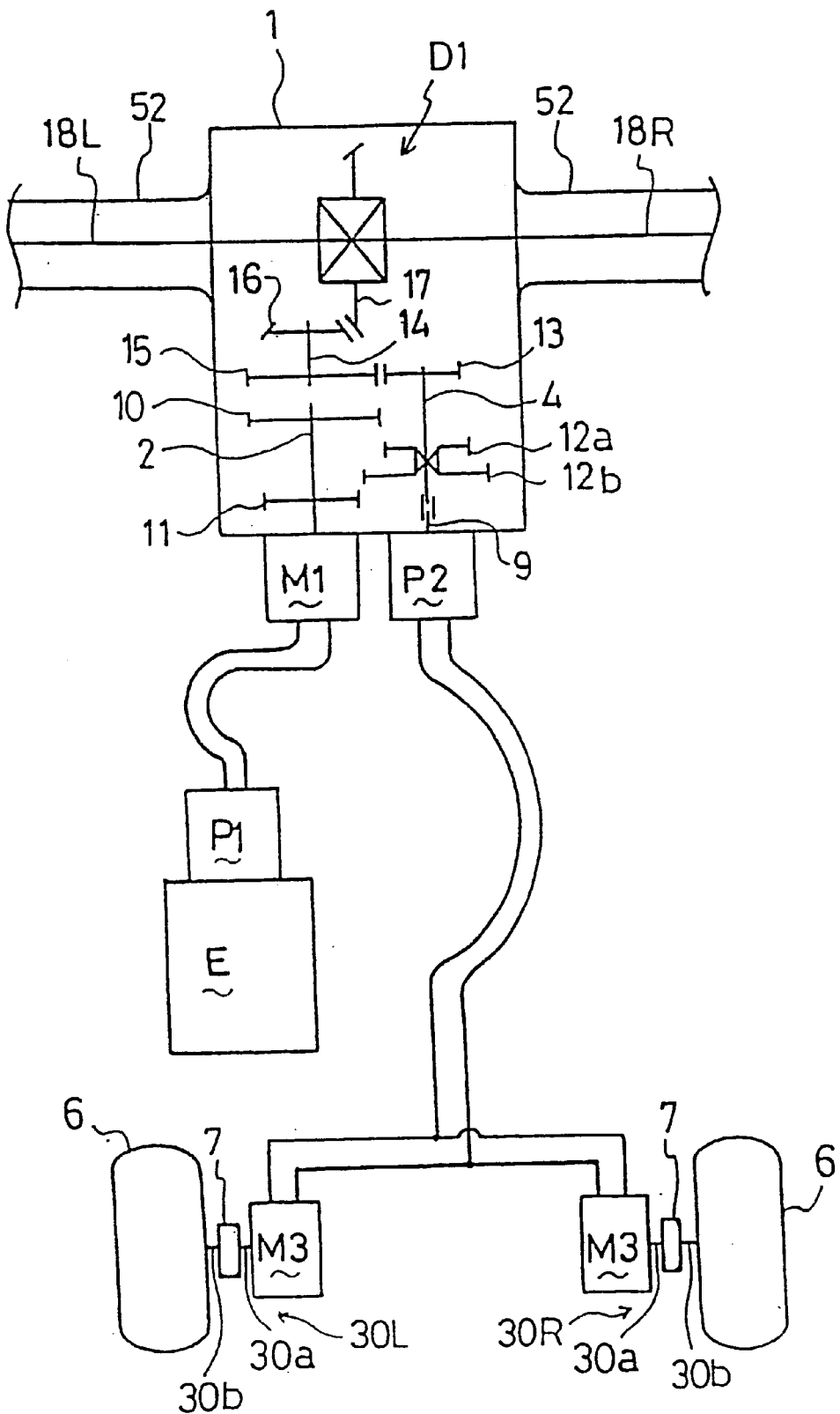
FIG. 11 is a diagram of a driving system of the second group, wherein clutches 7 are disposed on the output sides of a pair of second hydraulic motors M3.

The operation of an over-running clutch used as clutch 7, as shown in FIG. 10 and others, is similar with that of the above described clutch 7 of the first group, as shown in FIG. 3 and others. With regard to the operation of the pair of clutches 7 as over-running clutches shown in FIG. 11, they disengage when motor shafts 30a rotate at the same speed with or slower than axles 30b, and automatically engage when motor shafts 30b rotate faster than axles 30b. According to this construction, all of the four wheels are rotated at the same speed in normal traveling, so that main-driving wheels 5 drive second hydraulic motor M2 through output shaft 4 and second hydraulic pump P2. In this case, clutches 7 automatically disengage, so that axles 30b are not driven, thereby causing the vehicle to travel in two-wheel drive. When either or both of main-driving wheels 5 slip, the traveling speed of the vehicle is reduced, causing the rotary speed of sub-driving wheels 6 to become slower relative to that of main-driving wheels 5. Thus, each of clutches 7 automatically engages between motor shaft 30a and axle 30b, thereby driving sub-driving wheels 6 and causing the vehicle to travel in four-wheel drive.

Next, an explanation will be given on construction for preventing sub-driving wheels 6 from being dragged in turning according to FIGS. 12 to 18.

Figure 12:
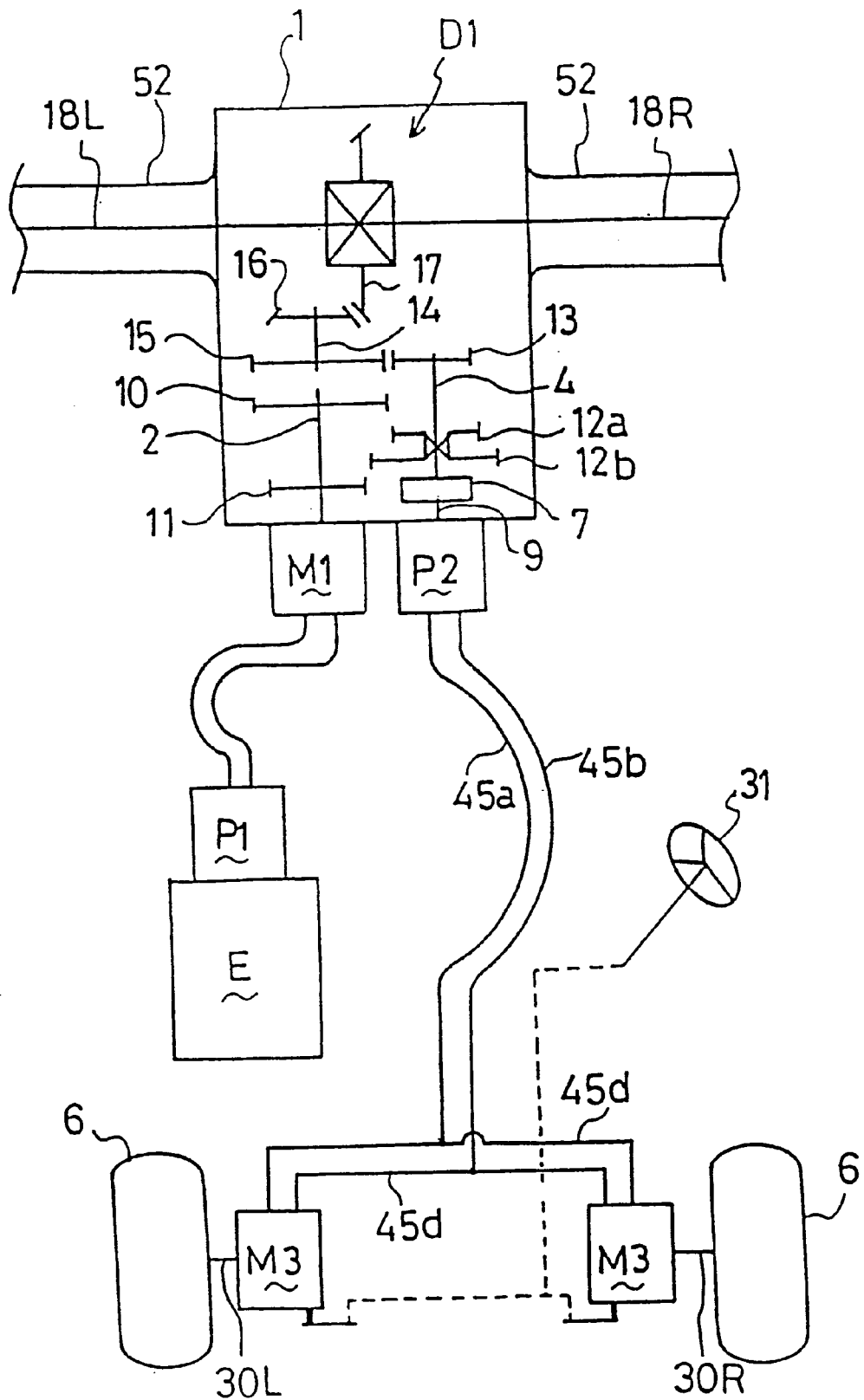
FIG. 12 is a diagram of a driving system of the second group, wherein the pair of second hydraulic motors M3 are drivingly changed by the turning operation of steering operating tool 31.

For the embodiment shown in FIG. 12, both displacement adjusting means, like movable swash plates, of the pair of left and right second hydraulic motors M3 with variable displacement interlock with steering operating tool 31, so that sub-driving wheels 6 are accelerated in proportion to the degree of turning operation of steering operating tool 31. This construction prevents dragging.

Figure 13:
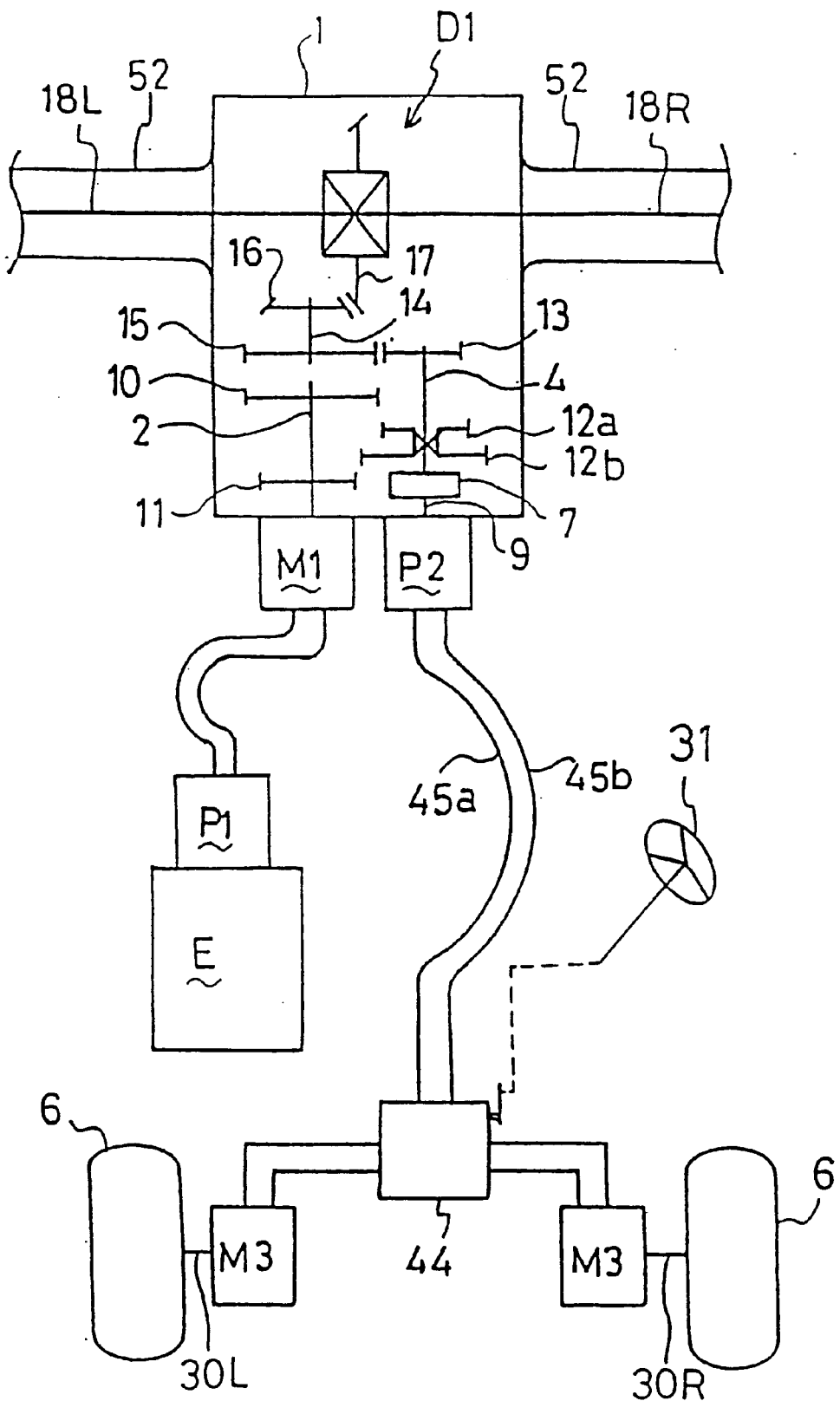
FIG. 13 is a diagram of another driving system of the second group, wherein the pair of second hydraulic motors M3 is drivingly changed by the turning operation of steering operating tool 31 through a flow control valve unit 44.

For the embodiment shown in FIG. 13, a flow control valve unit 44 is interposed on oil passages between second hydraulic pump P2 and the pair of second hydraulic motors M3. Flow control valve unit 44 changes the quantity of passing oil according to the turning operation of steering operating tool 31. This prevents the vehicle from dragging and enables it to turn smoothly.

Figure 14:
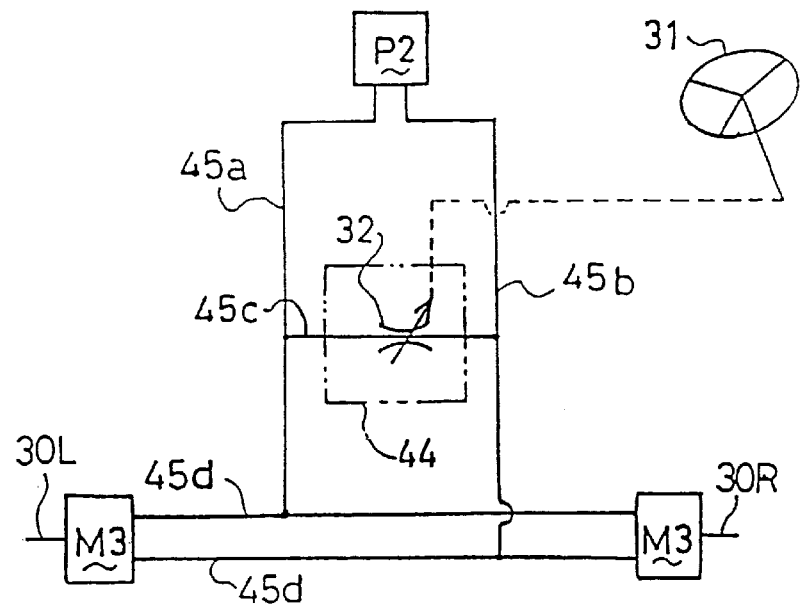
FIG. 14 is a diagram of an embodiment of a flow control valve unit 44.

An embodiment of flow control valve unit 44 will be described according to FIG. 14. A bypass oil passage 45c is interposed between oil passages 45a and 45b as a closed fluid circuit. A variable diaphragm 32 is provided on bypass oil passage 45c so as to interlock with steering operating tool 31. Variable diaphragm 32 is closed tight in proportion to the increase of rotational degree of steering operating tool 31, thereby accelerating the pair of second hydraulic motors M3 for preventing sub-driving wheels 6 from being dragged.

Figure 15:
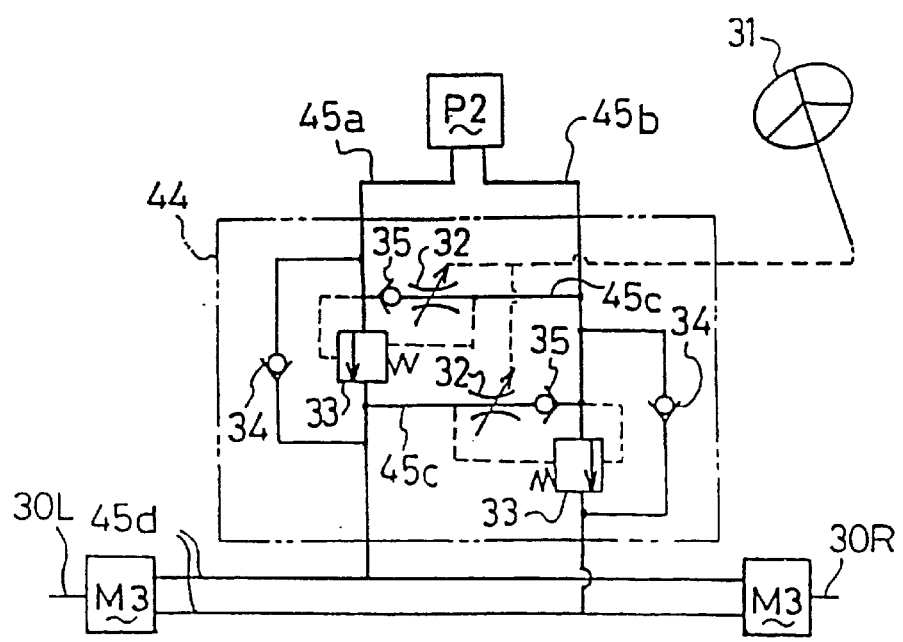
FIG. 15 is a diagram of another embodiment of a flow control valve unit 44.

Another embodiment of flow control valve unit 44 is shown in FIG. 15. In this regard, a pair of flowing adjusting valves, each of which comprises a variable diaphragm 32 and a relief valve 33, are provided respectively on oil passages 45a and 45b. A pair of check valves 35 are connected respectively to a pair of bypass oil passages 45c as primary oil circuits of the flowing adjusting valves. Each check valve 35 is disposed so as to allow the primary pressure oil of each flowing adjusting valve to pass through each variable diaphragm 32. A pair of check valves 34 are provided so as to allow the secondary oil of the flowing adjusting valves to flow into the primary oil circuit thereof. Accordingly, the quantity of oil flowing from high pressure portion to low pressure portion is limited, thereby accelerating sub-driving wheels 6 during the turning operation of steering operating tool 31, similar to the above mentioned.

Figure 16:
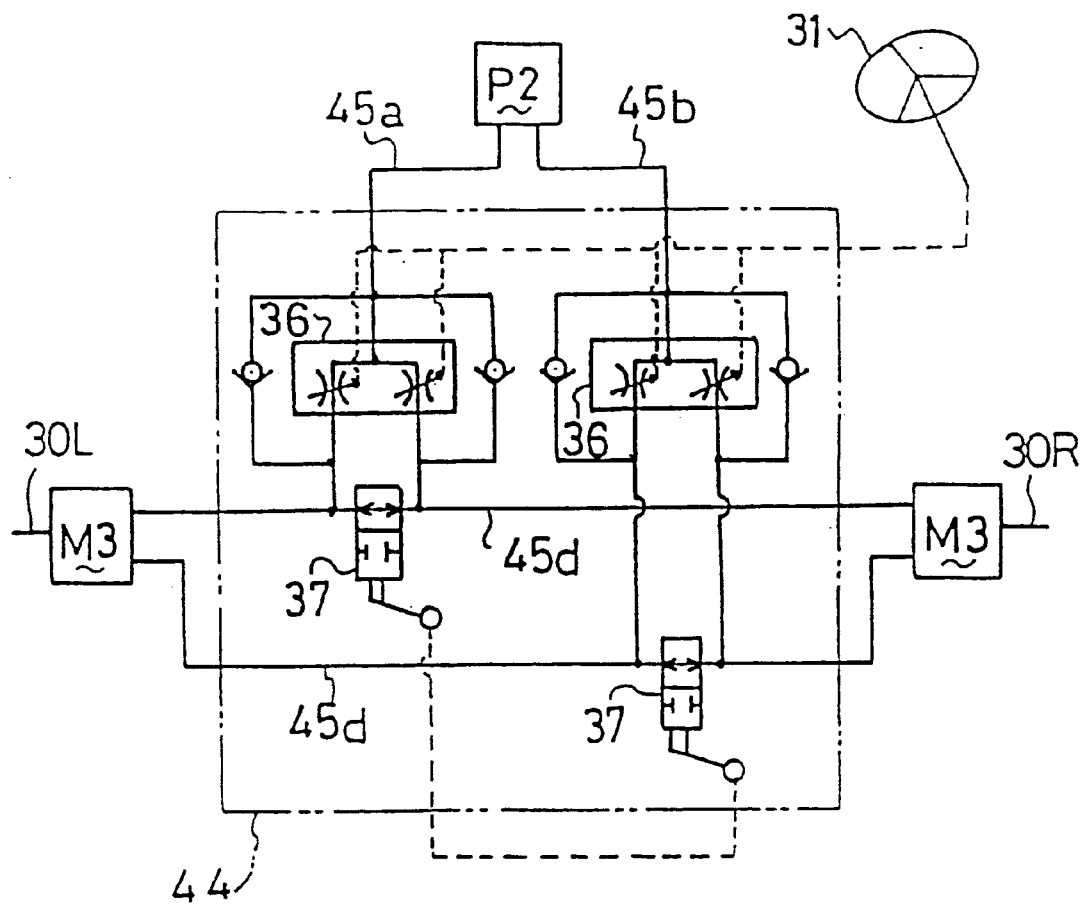
FIG. 16 is a diagram of another embodiment of a flow control valve unit 44.

Flow control valve unit 44 may also be constructed as shown in FIG. 16. In this regard, a pair of variable fixed quotient dividing valves 36 are interposed respectively on oil passages 45a and 45b. A pair of switching valves 37 are interposed respectively on a pair of oil passages 45d between left and right second hydraulic motors M3, so that the secondary oil circuit of each variable fixed quotient dividing valve 36 is connected to both primary and secondary oil circuits of each switching valve 37. The quantity of oil flowing through variable fixed quotient dividing oil valves 36 can be changed by the turning operation of steering operating tool 31. Also, when switching valves 37 are switched so as to block oil passages 45d, pressured oil of the quantity corresponding to the steering angle is charged from variable fixed quotient dividing oil valves 36 to left and right second hydraulic motors M2, thereby driving left and right sub-driving wheels 6.

Next, an explanation of the embodiments shown in FIGS. 17 and 18 will be given. Here, the displacement of second hydraulic pump P2 is changed during turning according to the detection of a difference of operating oil pressure between left and right second hydraulic motors M3. For the embodiment shown in FIG. 17, second hydraulic pump P2 has variable displacement and its displacement adjusting means, like a movable swash plate, is connected with an actuator 40 (a hydraulic cylinder, a solenoid or so on) which is controlled by a controller 41. If actuator 40 is a hydraulic cylinder, it is controlled by controller 41 as a servovalve or so on. A reference numeral CP1 designates a charge pump for driving the hydraulic cylinder. Controller 41 recognizes the vehicle is turning when it detects that the pressure of oil charged from second hydraulic pump P2 to left second hydraulic motor M3 is different from that to right second hydraulic motor M3. At this point, the quantity of oil discharged from second hydraulic pump P2 is increased, so that sub-driving wheels 6 are accelerated and prevented from being dragged.

Figure 18:
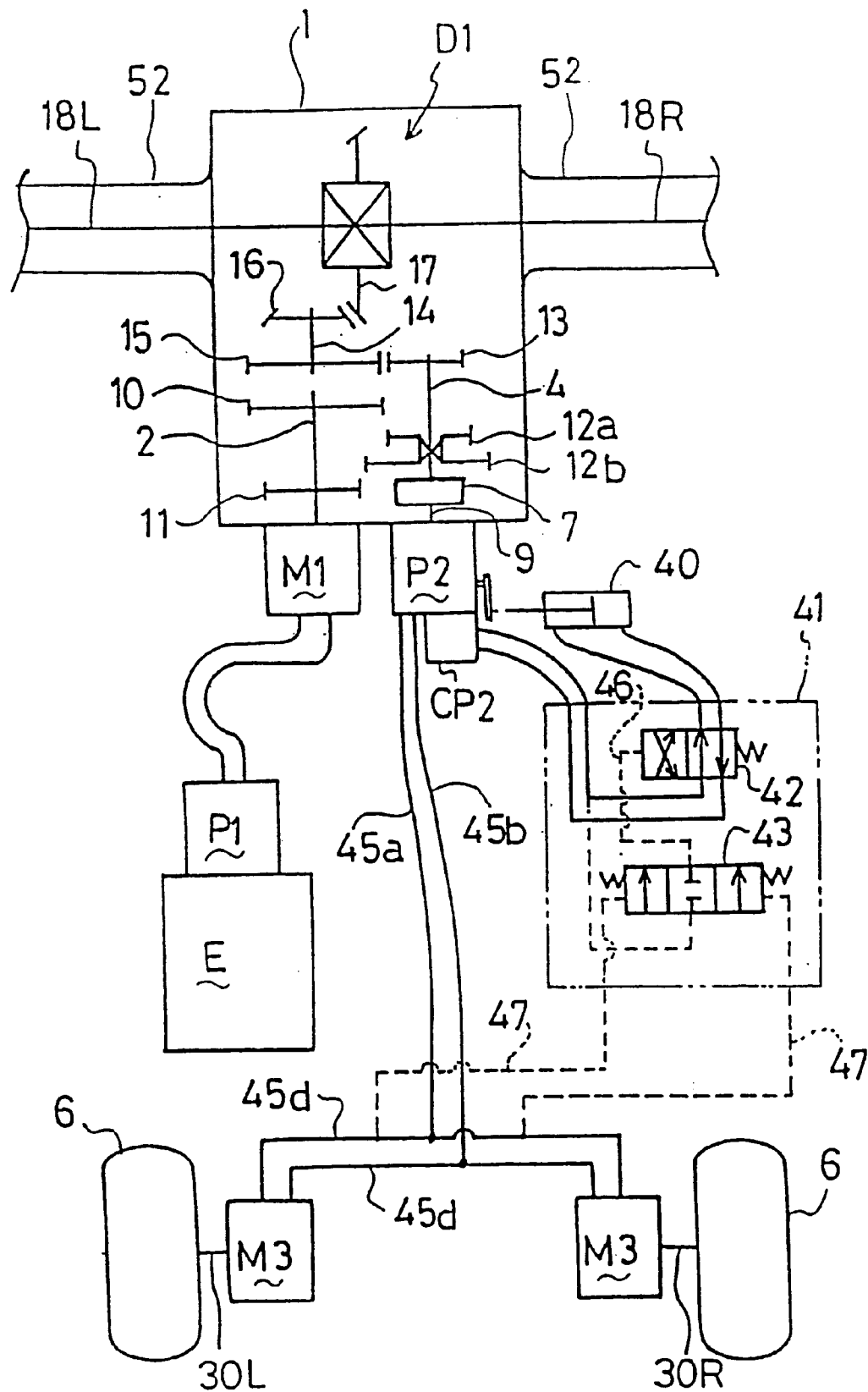
FIG. 18 is a diagram of another driving system of the second group, wherein the pair of second hydraulic motors M3 are drivingly changed by the detection of a difference between the rotary speeds of the main-driving wheels 5 and the sub-driving wheels 6.

For the embodiment shown in FIG. 18, a switching valve 42 and a pressure difference detecting valve 43 are replaced with a servovalve in controller 41. Switching valve 42 with two switching stages is interposed between actuator 40 and charge pump CP2 and is switched by pilot pressure oil flowing from pressure difference detecting valve 43 through a pilot oil passage 46. Pressure difference detecting valve 43 is switched by the difference of the oil pressure between a pair of pilot oil passages 47, which are branched respectively from the pair of oil passages 45d connecting left and right second hydraulic motors M3 with each other. When there is no oil pressure difference between oil passages 45d in the case of straight travel, pressure difference detecting valve 43 and switching valve 42 are not switched. When the difference is generated because of turning, pressure difference detecting valve 43 is switched, so that pilot pressure oil flows into pilot oil passage 46. Thus, switching valve 42 is switched so as to drive actuator 40. Accordingly, the oil discharged from second hydraulic pump P2 is increased, and left and right second hydraulic motors M3 are accelerated, thereby preventing sub-driving wheels 6 from being dragged.

Figure 17:
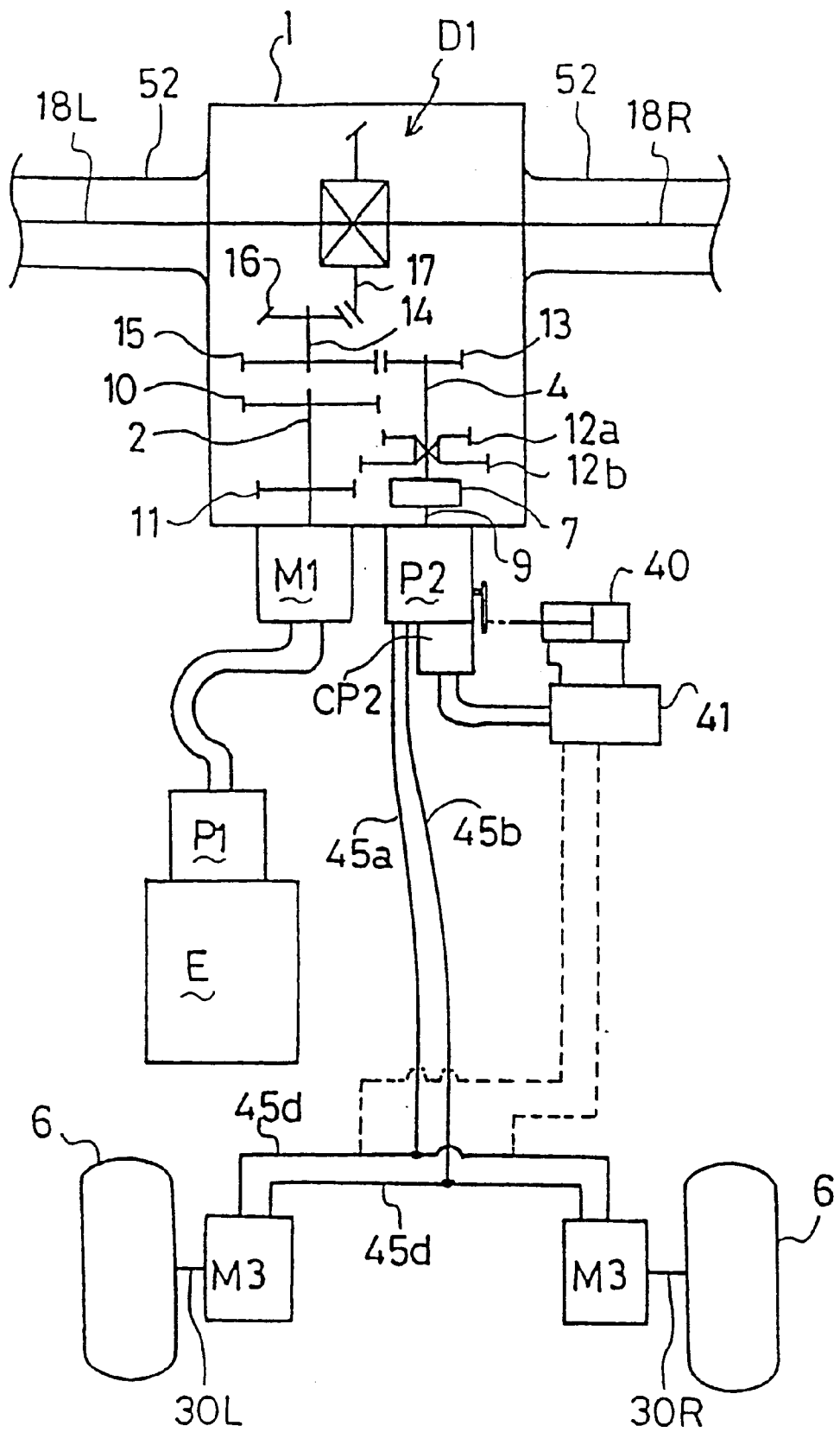
FIG. 17 is a diagram of a driving system of the second group, wherein the pair of second hydraulic motors M3 are drivingly changed by the detection of a difference between the rotary speeds of the main-driving wheels 5 and the sub-driving wheels 6.

With regard to the embodiment shown in FIGS. 17 or 18, controller 40 and actuator 41 may also be connected to left and right second hydraulic motor M3. Alternatively, these embodiments may be employed by the driving systems of the first group, such that controller 40 and actuator 41 are connected to second hydraulic pump P2 or second hydraulic motor M2.

Figure 19:
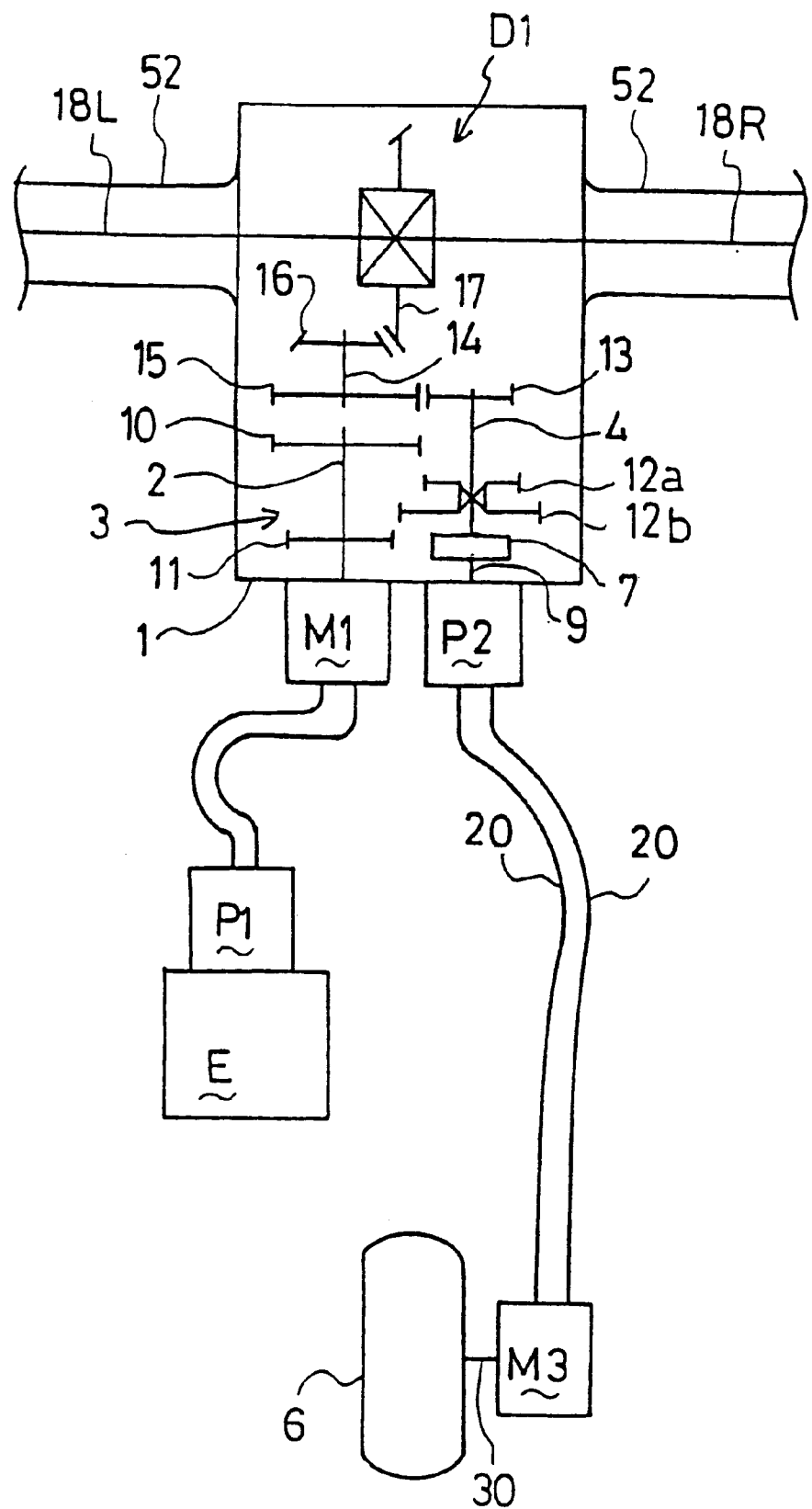
FIG. 19 is a diagram of a driving system including a single sub-driving wheel 6.

Furthermore, for the embodiment shown in FIG. 19, a single sub-driving wheel 6 is provided. Sub-driving wheel 6 is attached to an output shaft 30 of a single hydraulic motor M3. Thus, only single hydraulic motor M3 is required to drive single sub-driving wheel 6. The differential gear unit D2 is omitted, thereby simplifying the driving system so as to be suitable for a small mower tractor.

The present invention thus far described has the following effects:

First, because the output power of mechanical sub-transmission 3 is drivingly connected with output shaft 2 of first hydraulic motor M1, which is fluidly connected with first hydraulic pump P1 and is driven by the power of engine E through the closed fluid circuit, and drives main-driving wheels 5 and second hydraulic pump P2 fluidly connected with second hydraulic motor M2 for driving sub-driving wheels 6, sub-driving wheels 6 can be optionally changed by second hydraulic pump P1 and second hydraulic motor M2 according to the stepless transmitting of first hydraulic pump P1 and motor M1. This allows the vehicle to be switched between four-wheel drive and two-wheel drive easily and second hydraulic pump P2 to be rotated at a speed corresponding to the adjustment of the traveling speed.

In this construction, since main-driving wheels 5 are driven by first hydraulic motor M1 and sub-driving wheels 6 are driven thereby through clutch 7 acting as an over-running clutch, driving power is automatically transmitted into sub-driving wheels 6. This occurs in case of slipping of either of the main-driving wheels 5, so that the vehicle can easily escape from being stuck, thereby preventing the ground surface from being injured. In cases where clutch 7 is a manual clutch, manual operation of connecting clutch 7 enables the vehicle to easily escape from being stuck.

Also, since clutch 7 acting as an over-running clutch is interposed between output shaft 4 of sub-transmission 3 and input shaft 9 of second hydraulic pump P2, changing of the rotary speeds of main-driving wheels 5 and sub-driving wheels 6 can be easily detected, so that driving power can be rapidly given to sub-driving wheels 6.

Since second hydraulic pump P2 or motor M2 has variable displacement, the rotary speed of sub-driving wheels 6 can be easily changed.

Also, since second hydraulic pump P2 or motor M2 with variable displacement is connected with steering operating tool 31 so as to increase the rotary speed of sub-driving wheels 6 in proportion to the degree of turning operation of steering operating tool 31, sub-driving wheels 6 can be accelerated corresponding to the turning radius, thereby enabling the vehicle to turn easily.

Since output shaft 2 of first hydraulic pump P1 and output shaft 14 of sub-transmission 3 are longitudinally disposed and drivingly connected to first differential gear unit D1 for main-driving wheels 5 through bevel gears 16 and 17, transmission casing 1 can be laterally narrow, so as to be compacted.

Alternatively, since output shaft 2 of first hydraulic pump P1 and output shaft 14 of sub-transmission 3 are laterally disposed, they can be drivingly connected to first differential gear unit D1 for main-driving wheels 5 through plain gears 16' and 17', thereby improving the efficiency of transmitting into second differential gear unit D2. Additionally, this construction allows transmission casing 1 can be longitudinally short, so as to be compacted.

Secondly, because the output power of mechanical sub-transmission 3 is drivingly connected with an output shaft 2 of first hydraulic motor M1, which is fluidly connected with first hydraulic pump P1 and is driven by the power of engine E through the closed fluid circuit, and drives main-driving wheels 5 through first differential gear unit D1 and drives second hydraulic pump P2 fluidly connected with second hydraulic motor M2 for driving sub-driving wheels 6 through second differential gear unit D2, axles 18L and 18R with main-driving wheels 5 and axles 25L and 25R with sub-driving wheels 6 are fluidly connected. Thus, a transmitting shaft is not required to be disposed at the venter portion of the vehicle. This allows the space between axles 18L and 18R and axles 25L and 25R to be expanded, so as to provide a large space for attachment of a mid-mount working machine like side reel mowers 8SL and 8SR.

Thirdly, because the output power of mechanical sub-transmission 3 is drivingly connected with an output shaft 2 of first hydraulic motor M1, which is fluidly connected with first hydraulic pump P1 and is driven by the power of engine E through the closed fluid circuit, and drives main-driving wheels 5 through first differential gear unit D1 and also drives second hydraulic pump P2 fluidly connected with a pair of left and right second hydraulic motors M3 for driving left and right sub-driving wheels 6 respectively, axle casing 23 containing axles 25L and 25R with sub-driving wheels 6 therein can be made more compact and light.

In this construction, since second hydraulic pump P2 or left and right hydraulic motors M3, which have variable displacement, is connected with steering operating tool 31 so as to increase the rotary speed of sub-driving wheels 6 in proportion to the degree of the turning operation of steering operating tool 31, the rotary speed of sub-driving wheels 6 can correspond to the degree of the turning radius when turning. This allows the vehicle to turn smoothly without dragging of sub-driving wheels 6.

Also, since flow control valve unit 44, interposed on the oil circuit between second hydraulic pump P2 and second hydraulic motors M3, is connected with steering operating tool, the similar effect can be obtained.

Furthermore, since the pair of decelerator casings 29, disposed on both lateral sides of left and right front axle casings 52 respectively, project horizontally forward, space P can be provided between left and right decelerator casings 29, so that a working machine like middle front reel mower 8FM provided in space P can be disposed compactly. The working machine is also, then, protected by decelerator casings 29 and driving wheels 5 and 6. Also, the working machine can be disposed between main-driving wheels 5 and sub-driving wheels 6, so as to be limited in its forward projection. This shortens shortening the length of the working vehicle provided with the working machine. Also, an arm for suspending the working machine like middle front reel mower 8FM can be shortened, and in the case where a plurality of working machines like triple reel mowers 8FL, 8FM and 8FR are provided, the range of their overlap can be shortened.

A lifting mechanism for working machines like triple front reel mowers 8FL, 8FM and 8FR can also be disposed in space P, so that space P can be advantageously utilized. Also, the lifting mechanism can be disposed at the longitudinal and lateral middle of the vehicle body, thereby giving the vehicle a good balance of weight and enabling it to travel steadily.

Furthermore, since each decelerator casing 29 is disposed horizontally rather than vertically, the vehicle body can have a low center of gravity so as to travel steadily.

What is claimed is:

1. A driving system for a working vehicle comprising:
   main-driving wheels;
   sub-driving wheels;
   a first hydraulic pump driven by power from an engine;
   a first hydraulic motor fluidly connected with said first hydraulic pump;
   a transmission drivingly connected with an output shaft of said first hydraulic motor;
   a second hydraulic motor for driving said sub-driving wheels;
   a second hydraulic pump fluidly connected with said second hydraulic motor, wherein output power from said transmission drives said main-driving wheels and also drives said second hydraulic pump;
   a steering operating tool;
   wherein said second hydraulic pump or said second hydraulic motor has variable displacement; and
   wherein a displacement adjusting means of said second hydraulic pump or of said second hydraulic motor, which has variable displacement, is connected with said steering operating tool, so that said sub-driving wheels are accelerated in proportion to the degree of turning operation of said steering operating tool.

2. A driving system for a working vehicle comprising:
   main-driving wheels;
   sub-driving wheels;
   a first hydraulic pump driven by power from an engine;
   a first hydraulic motor fluidly connected with said first hydraulic pump;
   a transmission drivingly connected with an output shaft of said first hydraulic motor;
   a second hydraulic motor for driving said sub-driving wheels;
   a second hydraulic pump fluidly connected with said second hydraulic motor, wherein output power from said transmission drives said main-driving wheels and also drives said second hydraulic pump; and
   a differential gear unit for said main-driving wheels, wherein said output shaft of said first hydraulic motor and an output shaft of said transmission are disposed laterally, so as to transmit power to said differential gear unit.

3. A driving system for a working vehicle comprising:
   main-driving wheels;
   sub-driving wheels;
   a differential gear unit for said main driving wheels;
   a first hydraulic pump driven by power from an engine;
   a first hydraulic motor fluidly connected with said first hydraulic pump;
   a transmission drivingly connected with an output shaft of said first hydraulic motor;
   a second hydraulic motor for driving said sub-driving wheels;
   a second hydraulic pump fluidly connected with said second hydraulic motor, wherein output power from said transmission drives said main-driving wheels and also drives said second hydraulic pump through a clutch;
   wherein said output shaft of said first hydraulic motor and an output shaft of said transmission are disposed laterally.

4. A driving system for a working vehicle comprising:
   main-driving wheels;
   sub-driving wheels;
   a first hydraulic pump driven by power from an engine;
   a first hydraulic motor fluidly connected with said first hydraulic pump;
   a transmission drivingly connected with an output shaft of said first hydraulic motor;
   a differential gear unit for driving said main-driving wheels;
   a second hydraulic pump fluidly, wherein output power from said transmission drives said differential gear unit and also drives said second hydraulic pump; and
   a pair of second hydraulic motors provided for driving said sub-driving wheels respectively, wherein said second hydraulic motors are fluidly connected with said second hydraulic pump.

5. A driving system for a working vehicle as set forth in claim 4, further comprising:
   a steering operating tool, wherein said second hydraulic pump or said second hydraulic motors have variable displacement and one or more displacement adjusting means of said second hydraulic pump or said second hydraulic motors, which have variable displacement, is connected with said steering operating tool, so that said sub-driving wheels are accelerated in proportion to the degree of turning operation of said steering operating tool.

6. A driving system for a working vehicle as set forth in claim 4, further comprising:
   a steering operating tool; and
   a flow control valve unit interposed in an oil circuit between said second hydraulic pump and said second hydraulic motors, wherein said flow control valve unit and said steering operating tool are connected with each other, so that the quantity of oil discharged from said second hydraulic motors is increased in proportion to the degree of turning operation of said steering operating tool.

7. A driving system for a working vehicle comprising:
   main-driving wheels;
   sub-driving wheels;
   a first hydraulic pump driven by power from an engine;
   a first hydraulic motor fluidly connected with said first hydraulic pump;
   a transmission drivingly connected with an output shaft of said first hydraulic motor, wherein output power from said transmission drives said main-driving wheels;
   a second hydraulic motor for driving said sub-driving wheels;
   a second hydraulic pump fluidly connected with said second hydraulic motor, driven by said transmission; and
   a clutch disposed between said transmission and said sub-driving wheels.

* * * * *